United States Patent
Mackinlay et al.

(10) Patent No.: US 10,712,903 B2
(45) Date of Patent: Jul. 14, 2020

(54) SYSTEMS AND METHODS FOR RANKING DATA VISUALIZATIONS USING DIFFERENT DATA FIELDS

(71) Applicant: Tableau Software Inc., Seattle, WA (US)

(72) Inventors: Jock Douglas Mackinlay, Seattle, WA (US); Christopher Richard Stolte, Seattle, WA (US); Patrick Hanrahan, Portola Valley, CA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

(21) Appl. No.: 15/436,706

(22) Filed: Feb. 17, 2017

(65) Prior Publication Data
US 2017/0249369 A1    Aug. 31, 2017

Related U.S. Application Data

(63) Continuation of application No. 14/549,482, filed on Nov. 20, 2014, now Pat. No. 10,386,989, which is a
(Continued)

(51) Int. Cl.
*G06F 16/248* (2019.01)
*G06F 3/0481* (2013.01)
(Continued)

(52) U.S. Cl.
CPC ...... *G06F 3/04817* (2013.01); *G06F 16/2379* (2019.01); *G06F 16/2393* (2019.01);
(Continued)

(58) Field of Classification Search
CPC .... G06F 3/0481; G06F 3/0482; G06F 3/0483; G06F 9/4443; G06F 3/04845;
(Continued)

(56) References Cited

U.S. PATENT DOCUMENTS

| | | |
|---|---|---|
| 4,800,810 A | 1/1989 | Masumoto |
| 5,036,314 A | 7/1991 | Barillari et al. |

(Continued)

FOREIGN PATENT DOCUMENTS

| | | |
|---|---|---|
| HU | 215657 B | 1/1994 |
| WO | WO 1997/012334 A1 | 4/1997 |
| WO | WO 2006/060773 A2 | 6/2006 |

OTHER PUBLICATIONS

Mackinlay, Pre-Interview Office Action, U.S. Appl. No. 15/632,253, dated Dec. 31, 2018, 4 pgs.
(Continued)

*Primary Examiner* — Arpan P. Savla
*Assistant Examiner* — Erik V Stitt
(74) *Attorney, Agent, or Firm* — Morgan, Lewis & Bockius LLP

(57) ABSTRACT

The implementations described herein include methods and systems for ranking data visualizations. A method is performed at a computing device having one or more processors and memory storing programs for execution by the processors. The method receives user selection of a set of data fields and identifies data visualizations that use each data field in the user-selected set. The method automatically forms modified sets of data fields that each differ from the user-selected set by at most two atomic operations, each selected from: removing or adding a data field; replacing a user-selected data field with a hierarchically narrower or broader data field; or adding, removing, or modifying a filter for a data field. The method identifies alternative data visualizations using each respective modified set, computes a score for each data visualization and alternative data visualization, and presents high scoring data visualizations and high scoring alternative data visualizations to the user.

20 Claims, 19 Drawing Sheets

Related U.S. Application Data continuation of application No. 13/352,137, filed on Jan. 17, 2012, now Pat. No. 9,600,528, which is a continuation of application No. 11/223,658, filed on Sep. 9, 2005, now Pat. No. 8,099,674.

(51) Int. Cl.
| | | |
|---|---|---|
| *G06F 16/25* | (2019.01) | |
| *G06F 16/28* | (2019.01) | |
| *G06F 16/23* | (2019.01) | |
| *G06F 16/9535* | (2019.01) | |
| *G06F 16/2457* | (2019.01) | |
| *G06Q 40/02* | (2012.01) | |
| *G06F 3/0482* | (2013.01) | |
| *G06T 11/20* | (2006.01) | |

(52) U.S. Cl.
CPC ...... *G06F 16/248* (2019.01); *G06F 16/24578* (2019.01); *G06F 16/252* (2019.01); *G06F 16/283* (2019.01); *G06F 16/9535* (2019.01); *G06Q 40/025* (2013.01); *G06F 3/0482* (2013.01); *G06T 11/206* (2013.01)

(58) Field of Classification Search
CPC ............. G06F 3/04847; G06F 3/04817; G06F 16/2379; G06F 16/9535; G06F 16/2393; G06F 16/24578; G06F 16/283; G06F 16/248; G06F 16/252; G06F 16/25; G06F 16/28; G06F 16/23; G06F 16/2457; G06Q 40/025; G06Q 40/02; G06T 11/206; G06T 11/20
See application file for complete search history.

(56) References Cited

U.S. PATENT DOCUMENTS

| | | |
|---|---|---|
| 5,060,980 A | 10/1991 | Johnson et al. |
| 5,143,888 A | 9/1992 | Olbrich |
| 5,144,452 A | 9/1992 | Abuyama |
| 5,169,713 A | 12/1992 | Kumurdjian |
| 5,265,244 A | 11/1993 | Ghosh et al. |
| 5,265,246 A | 11/1993 | Li et al. |
| 5,377,348 A | 12/1994 | Lau et al. |
| 5,383,029 A | 1/1995 | Kojima |
| 5,416,895 A | 5/1995 | Anderson et al. |
| 5,461,708 A | 10/1995 | Kahn |
| 5,560,007 A | 9/1996 | Thai |
| 5,577,241 A | 11/1996 | Spencer |
| 5,581,677 A | 12/1996 | Myers et al. |
| 5,664,172 A | 9/1997 | Antoshenkov |
| 5,664,182 A | 9/1997 | Nierenberg et al. |
| 5,668,987 A | 9/1997 | Schneider |
| 5,794,246 A | 8/1998 | Sankaran et al. |
| 5,864,856 A | 1/1999 | Young |
| 5,893,088 A | 4/1999 | Hendricks et al. |
| 5,894,311 A | 4/1999 | Jackson |
| 5,933,830 A | 8/1999 | Williams |
| 6,014,661 A | 1/2000 | Ahlberg |
| 6,031,632 A | 2/2000 | Yoshihara et al. |
| 6,032,158 A | 2/2000 | Mukhopadhyay et al. |
| 6,044,374 A | 3/2000 | Nesamoney et al. |
| 6,100,901 A | 8/2000 | Mohda et al. |
| 6,115,744 A | 9/2000 | Robins et al. |
| 6,137,488 A | 10/2000 | Kraft et al. |
| 6,154,766 A | 11/2000 | Yost et al. |
| 6,173,310 B1 | 1/2001 | Yost et al. |
| 6,188,403 B1 | 2/2001 | Sacerdoti et al. |
| 6,208,990 B1 | 3/2001 | Suresh et al. |
| 6,222,540 B1 * | 4/2001 | Sacerdoti ............. G06T 11/206 345/581 |
| 6,247,008 B1 | 6/2001 | Cambot et al. |
| 6,253,257 B1 | 6/2001 | Dundon |
| 6,260,050 B1 | 7/2001 | Yost et al. |
| 6,269,393 B1 | 7/2001 | Yost et al. |
| 6,300,957 B1 | 10/2001 | Rao et al. |
| 6,301,579 B1 | 10/2001 | Becker |
| 6,317,750 B1 | 11/2001 | Tortolani et al. |
| 6,327,628 B1 | 12/2001 | Anuff et al. |
| 6,339,775 B1 | 1/2002 | Zamanian et al. |
| 6,377,259 B1 | 4/2002 | Tenev et al. |
| 6,397,195 B1 | 5/2002 | Pinard et al. |
| 6,397,204 B1 | 5/2002 | Liu et al. |
| 6,400,366 B1 | 6/2002 | Davies et al. |
| 6,405,195 B1 | 6/2002 | Ahlberg |
| 6,405,208 B1 | 6/2002 | Raghavan et al. |
| 6,411,313 B1 | 6/2002 | Conlon et al. |
| 6,424,933 B1 | 7/2002 | Agrawala et al. |
| 6,490,593 B2 | 12/2002 | Proctor |
| 6,492,989 B1 | 12/2002 | Wilkinson |
| 6,505,205 B1 | 1/2003 | Kothuri et al. |
| 6,522,342 B1 | 2/2003 | Gagnon et al. |
| 6,528,217 B2 | 3/2003 | Cutter et al. |
| 6,529,217 B1 | 3/2003 | Maguire, III et al. |
| 6,581,068 B1 | 6/2003 | Bensoussan et al. |
| 6,590,577 B1 | 7/2003 | Yonts |
| 6,601,075 B1 * | 7/2003 | Huang .............. G06F 17/30864 707/748 |
| 6,611,825 B1 | 8/2003 | Billheimer et al. |
| 6,626,959 B1 | 9/2003 | Moise et al. |
| 6,643,646 B2 | 11/2003 | Su et al. |
| 6,701,485 B1 | 3/2004 | Igra et al. |
| 6,707,454 B1 | 3/2004 | Barg et al. |
| 6,714,897 B2 | 3/2004 | Whitney et al. |
| 6,725,230 B2 | 4/2004 | Ruth et al. |
| 6,750,864 B1 | 6/2004 | Anwar |
| 6,763,308 B2 | 7/2004 | Chu et al. |
| 6,768,986 B2 | 7/2004 | Cras et al. |
| 6,867,788 B1 | 3/2005 | Takeda |
| 6,906,717 B2 | 6/2005 | Couckuyt et al. |
| 6,920,608 B1 | 7/2005 | Davis |
| 6,928,433 B2 | 8/2005 | Goodman et al. |
| 6,961,716 B2 | 11/2005 | Rhodes |
| 6,985,905 B2 | 1/2006 | Prompt et al. |
| 7,009,609 B2 | 3/2006 | Miyadai |
| 7,089,266 B2 | 8/2006 | Stolte et al. |
| 7,117,058 B2 | 10/2006 | Lin et al. |
| 7,168,035 B1 | 1/2007 | Bell et al. |
| 7,176,923 B2 | 2/2007 | Vignet |
| 7,181,450 B2 | 2/2007 | Malloy et al. |
| 7,250,951 B1 | 7/2007 | Hurley et al. |
| 7,315,305 B2 | 1/2008 | Crotty et al. |
| 7,328,407 B2 | 2/2008 | MacLaurin |
| 7,346,839 B2 | 3/2008 | Acharya |
| 7,366,993 B2 * | 4/2008 | Joffrain ................ G06F 3/0486 345/440 |
| 7,379,601 B2 | 5/2008 | Yang et al. |
| 7,420,562 B2 | 9/2008 | Shinohara et al. |
| 7,630,971 B2 | 12/2009 | Arrouye et al. |
| 7,694,278 B2 | 4/2010 | Pasumansky et al. |
| 7,716,225 B1 * | 5/2010 | Dean ................ G06F 17/30867 707/748 |
| 7,725,483 B2 | 5/2010 | Poyourow et al. |
| 7,761,784 B2 | 7/2010 | Parks et al. |
| 7,853,456 B2 | 12/2010 | Soto et al. |
| 7,999,809 B2 | 8/2011 | Beers et al. |
| 8,140,391 B2 | 3/2012 | Jacobi et al. |
| 8,250,012 B1 * | 8/2012 | Whitman ................ G06Q 30/02 706/45 |
| 8,269,773 B2 | 9/2012 | Gregg, III |
| 8,321,781 B2 | 11/2012 | Tolle |
| 8,412,726 B2 * | 4/2013 | Yan .................... G06F 16/9535 707/767 |
| 8,860,727 B2 | 10/2014 | Beers et al. |
| 9,053,149 B2 | 6/2015 | Ebenstein et al. |
| 9,792,017 B1 | 10/2017 | Landefeld et al. |
| 2002/0016699 A1 | 2/2002 | Hoggart et al. |
| 2002/0032682 A1 * | 3/2002 | Kobayashi .......... G06F 17/3069 |
| 2002/0070953 A1 | 6/2002 | Barg et al. |
| 2002/0118192 A1 | 8/2002 | Couckuyt et al. |
| 2002/0123865 A1 | 9/2002 | Whitney et al. |
| 2002/0133441 A1 | 9/2002 | Tanaka |
| 2002/0138636 A1 | 9/2002 | Buttner et al. |

(56) References Cited

U.S. PATENT DOCUMENTS

| | | | |
|---|---|---|---|
| 2002/0154118 | A1 | 10/2002 | McCarthy et al. |
| 2002/0161664 | A1 | 10/2002 | Shaya et al. |
| 2003/0042928 | A1 | 3/2003 | Tsai |
| 2003/0071814 | A1 | 4/2003 | Jou et al. |
| 2003/0154443 | A1* | 8/2003 | Papierniak ............ G06T 11/206 715/211 |
| 2003/0200034 | A1 | 10/2003 | Fellenberg et al. |
| 2003/0204511 | A1 | 10/2003 | Brundage et al. |
| 2004/0181543 | A1* | 9/2004 | Wu .................. G06F 17/30572 |
| 2004/0183800 | A1 | 9/2004 | Peterson |
| 2004/0210491 | A1* | 10/2004 | Sadri ...................... G06Q 30/02 705/12 |
| 2004/0224577 | A1 | 11/2004 | Kaji |
| 2004/0227759 | A1 | 11/2004 | McKnight et al. |
| 2004/0243593 | A1 | 12/2004 | Stolte et al. |
| 2005/0035966 | A1 | 2/2005 | Pasquarette et al. |
| 2005/0035967 | A1 | 2/2005 | Joffrain et al. |
| 2005/0038717 | A1 | 2/2005 | McQueen, III et al. |
| 2005/0060300 | A1 | 3/2005 | Stolte et al. |
| 2005/0099423 | A1 | 5/2005 | Brauss |
| 2005/0210389 | A1 | 9/2005 | Middelfart |
| 2005/0231392 | A1* | 10/2005 | Meehan ................. G06Q 10/10 340/995.1 |
| 2005/0234688 | A1 | 10/2005 | Pinto et al. |
| 2005/0234920 | A1 | 10/2005 | Rhodes |
| 2006/0020586 | A1 | 1/2006 | Prompt et al. |
| 2006/0020641 | A1 | 1/2006 | Walsh et al. |
| 2006/0031187 | A1 | 2/2006 | Pyrce et al. |
| 2006/0053363 | A1 | 3/2006 | Bargh et al. |
| 2006/0100873 | A1 | 5/2006 | Bittner et al. |
| 2006/0101391 | A1 | 5/2006 | Ulke et al. |
| 2006/0112123 | A1 | 5/2006 | Clark et al. |
| 2006/0129913 | A1 | 6/2006 | Vigesaa et al. |
| 2006/0136819 | A1 | 6/2006 | Tolle et al. |
| 2006/0136825 | A1 | 6/2006 | Cory et al. |
| 2006/0143205 | A1 | 6/2006 | Fuchs |
| 2006/0206512 | A1* | 9/2006 | Hanrahan ......... G06F 17/30554 |
| 2006/0212412 | A1 | 9/2006 | Sapir |
| 2006/0218499 | A1* | 9/2006 | Matthews ......... G06F 17/30616 715/765 |
| 2006/0229753 | A1 | 10/2006 | Seskin et al. |
| 2007/0055487 | A1 | 3/2007 | Habitz et al. |
| 2007/0061344 | A1 | 3/2007 | Dickerman et al. |
| 2007/0100824 | A1 | 5/2007 | Richardson et al. |
| 2007/0112844 | A1 | 5/2007 | Tribble et al. |
| 2008/0059422 | A1 | 3/2008 | Tenni et al. |
| 2008/0115049 | A1 | 5/2008 | Tolle et al. |
| 2008/0133573 | A1 | 6/2008 | Haft et al. |
| 2009/0276399 | A1* | 11/2009 | Irmak ................. G06F 17/3064 |
| 2009/0300547 | A1* | 12/2009 | Bates ................... G06F 16/954 715/825 |
| 2010/0191582 | A1* | 7/2010 | Dicker .................. G06Q 30/02 705/14.51 |
| 2013/0080444 | A1 | 3/2013 | Wakefield et al. |

OTHER PUBLICATIONS

Mackinlay, Final Office Action, U.S. Appl. No. 14/549,482, dated Aug. 23, 2017, 14 pgs.
Mackinlay, Office Action, U.S. Appl. No. 14/549,482, dated Jan. 10, 2018, 13 pgs.
Mackinlay, Office Action, U.S. Appl. No. 14/549,482, dated Sep. 10, 2018, 15pgs.
Mackinlay, First Action Interview Office Action, U.S. Appl. No. 15/632,253, dated Sep. 6, 2019, 20 pgs.
Mackinlay, Notice of Allowance, U.S. Appl. No. 14/549,482, dated Jun. 12, 2019, 7 pgs.
Mackinlay, Office Action, U.S. Appl. No. 16/162,332, dated Jan. 29, 2020, 22 pgs.
Becker, Trellis Graphics Displays: A Multi-Dimensional Data Visualization Tool for Data Mining, 1997, 13 pgs.
Becker, Visualizing Decision Table Classifiers, 1998, 4 pgs.
Beers, Notice of Allowance, U.S. Appl. No. 11/787,761, dated Apr. 8, 2011, 8 pgs.
Beers, Office Action, U.S. Appl. No. 11/787,761, dated Dec. 1, 2010, 16 pgs.
Beers, Office Action, U.S. Appl. No. 11/787,761, dated Jul. 8, 2009, 14 pgs.
Beers, Office Action, U.S. Appl. No. 11/787,761, dated Jun. 12, 2008, 12 pgs.
Beers, Office Action, U.S. Appl. No. 11/787,761, dated Sep. 14, 2010, 12 pgs.
Beers, Office Action, U.S. Appl. No. 11/787,761, dated Dec. 17, 2008, 13 pgs.
Beers, Office Action, U.S. Appl. No. 11/787,761, dated Apr. 28, 2010, 10 pgs.
Beers, Office Action, U.S. Appl. No. 11/787,761, dated Nov. 30, 2009, 14 pgs.
Beers, Office Action, U.S. Appl. No. 14/514,319, dated Jun. 4, 2015, 14 pgs.
Beers, Office Action, U.S. Appl. No. 13/211,048, dated Oct. 11, 2012, 13 pgs.
Beers, Notice of Allowance, U.S. Appl. No. 13/211,048, dated Feb. 3, 2014, 5 pgs.
Beers, Notice of Allowance, U.S. Appl. No. 13/211,048, dated Jun. 3, 2014, 9 pgs.
Bosch, Performance Analysis and Visualization of Parallel Systems Using SimOS and Rivet: A Case Study, Jan. 2000, 12 pgs.
Bosch, Rivet: A Flexible Environment for Computer Systems Visualization, Jan. 2000, 9 pgs.
Brunk, MineSet: An Integrated System for Data Mining, 1997, 4 pgs.
Cleveland, Graphical Perception: Theory, Experimentation, and Application to the Development of Graphical Methods, Sep. 1984, 24 pgs.
Derthick, An Interactive Visual Query Environment for Exploring Data, 1997, 11 pgs.
Freeze, Unlocking OLAP with Microsoft SQL Server and Excel 2000, 2000, pp. 155-332 and 379-422.
Fu, Implementation of Three-dimensional Scagnostics, University of Waterloo, 2009, 61 pgs.
Goldstein, A Framework for Knowledge-Based Interactive Data Exploration, Dec. 1994, 30 pgs.
Gotz, Behavior-Driven Visualization Recommendation, IBM T.J. Watson Research Center, Feb. 8-11, 2009, 10 pgs.
Gray, Data Cube: A Relational Aggregation Operator Generalizing Group-By, Cross-Tab, and Sub-Total, 1997, 25 pgs.
Hanrahan, Notice of Allowance, U.S. Appl. No. 11/005,652, dated May 18, 2010, 4 pgs.
Hanrahan, Office Action, U.S. Appl. No. 11/005,652, dated Feb. 20, 2009, 12 pgs.
Hanrahan, Office Action, U.S. Appl. No. 11/005,652, dated Oct. 23, 2009, 14 pgs.
Hanrahan, Office Action, U.S. Appl. No. 11/005,652, dated Jul. 24, 2008, 11 pgs.
Hanrahan, Office Action, U.S. Appl. No. 11/005,652, dated Dec. 27, 2007, 11 pgs.
Hanrahan, Specification, U.S. Appl. No. 11/005,652, Dec. 2, 2004, 104 pgs.
Healey, on the Use of Perceptual Cues and Data Mining for Effective Visualization of Scientific Datasets, 1998, 8 pgs.
Key, VizDeck: Self-Organizing Dashboards for Visual Analytics, SIGMOD, May 20-24, 2012, 4 pgs.
Kohavi, Data Mining and Visualization, 2000, 8 pgs.
Livny, DEVise: Integrated Querying and Visual Exploration of Large Datasets, May 1997, 12 pgs.
MacDonald, Creating Basic Charts, 2006, 46 pgs.
MacKinlay, Notice of Allowance, U.S. Appl. No. 12/214,818, dated May 13, 2014, 9 pgs.
MacKinlay, Automating the Design of Graphical Presentations of Relational Information, 1986, 34 pgs.
MacKinlay, Show Me: Automatic Presentation for Visual Analysis, 2007, 8 pgs.
MacKinlay, Final Office Action, U.S. Appl. No. 13/352,137, dated Aug. 30, 2016, 14 pgs.

(56) References Cited

OTHER PUBLICATIONS

MacKinlay, Office Action, U.S. Appl. No. 13/352,137, dated Feb. 11, 2016, 14 pgs.
MacKinlay, Office Action, U.S. Appl. No. 13/352,137, dated Jul. 27, 2015, 15 pgs.
MacKinlay, Final Office Action, U.S. Appl. No. 13/352,137, dated Apr. 22, 2015, 15 pgs.
MacKinlay, Office Action, U.S. Appl. No. 13/352,137, dated Dec. 12, 2014, 11 pgs.
MacKinlay, Notice of Allowance, U.S. Appl. No. 13/352,137, dated Jan. 17, 2017, 7 pgs.
MacKinlay, Office Action, U.S. Appl. No. 11/223,658, dated Jun. 10, 2010, 22 pgs.
MacKinlay, Office Action, U.S. Appl. No. 11/223,658, dated Nov. 12, 2009, 22 pgs.
MacKinlay, Office Action, U.S. Appl. No. 11/223,658, dated Jan. 21, 2011, 22 pgs.
Mackinlay, Office Action, U.S. Appl. No. 11/223,658, dated May 21, 2008, 20 pgs.
MacKinlay, Office Action, U.S. Appl. No. 11/223,658, dated Feb. 23, 2009, 19 pgs.
MacKinlay, Office Action, U.S. Appl. No. 14/549,482, dated Aug. 6, 2015, 9 pgs.
MacKinlay, Final Office Action, U.S. Appl. No. 14/549,482, dated Mar. 10, 2016, 10 pgs.
MacKinlay, Office Action, U.S. Appl. No. 14/549,482, dated Jun. 10, 2016, 10 pgs.
MacKinlay, Final Office Action, U.S. Appl. No. 14/549,482, dated Sep. 22, 2016, 12 pgs.
MacKinlay, Office Action, U.S. Appl. No. 14/549,482, dated Jan. 13, 2017, 12 pgs.
MacKinlay, Specification, U.S. Appl. No. 11/223,658, Sep. 5, 2005, 58 pgs.
Magyar Szabadalmi Hivatal, HU Search Report, HU P0700460, dated Oct. 9, 2007, 1 pg.
Matching and ranking legal citations, Publication No. WO1997012334A1, Google Patents, https://www.google.com/patents/WO1997012334A1?cl=en&dq=user+ranking+document+type&hl=en&sa=X&ved=OahUKEwin5K_19YILAhVP&mMKHeU2DO . . . Downloaded on Feb. 20, 2016, 11 pgs.
Miller, The Magical Number Seven, Plus or Minus Two: Some Limits on Our Capacity for Processing Information, Mar. 2014, 19 pgs.
Perlin, An Alternative Approach to the Computer Interface, 1993, 11 pgs.
Rao, The Table Lens: Merging Graphical and Symbolic Representations in an Interactive Focus+Context Visualization for Tabular Information, Apr. 1994, 7 pgs.
Roth, Interactive Graphics Design Using Automatic Presentation Knowledge, Apr. 24-28, 1994, 7 pgs.
Roth, Visage: A User Interface Environment for Exploring Information, Oct. 28-29, 2006, 9 pgs.
Screen Dumps for Microsoft Office Excel 2003 SP2, figures 1-24, 2003, 19 pgs.
Spenke, Focus: The Interactive Table for Product Comparison and Selection, Nov. 6-8, 1996, 10 pgs.
Stevens, On the Theory of Scales of Measurement, Jun. 7, 1946, 4 pgs.
Stolte, Multiscale Visualization Using Data Cubes, 2002, 8 pgs.
Stolte, Notice of Allowance, U.S. Appl. No. 10/453,834, dated Mar. 27, 2006, 3 pgs.
Stolte, Notice of Allowance, U.S. Appl. No. 10/667,194, dated Mar. 5, 2010, 4 pgs.
Stolte, Notice of Allowance, U.S. Appl. No. 11/488,407, dated Dec. 29, 2009, 8 pgs.
Stolte, Notice of Allowance, U.S. Appl. No. 12/821,029, dated Sep. 24, 2012, 8 pgs.
Stolte, Office Action, U.S. Appl. No. 10/667,194, dated Jan. 7, 2008, 10 pgs.
Stolte, Office Action, U.S. Appl. No. 10/667,194, dated Feb. 9, 2009, 11 pgs.
Stolte, Office Action, U.S. Appl. No. 10/667,194, dated Aug. 14, 2007, 16 pgs.
Stolte, Office Action, U.S. Appl. No. 10/667,194, dated Aug. 14, 2008, 10 pgs.
Stolte, Office Action, U.S. Appl. No. 10/667,194, dated Jan. 18, 2007, 15 pgs.
Stolte, Office Action, U.S. Appl. No. 10/667,194, dated Sep. 25, 2009, 10 pgs.
Stolte, Office Action, U.S. Appl. No. 10/667,194, dated Jun. 26, 2006, 13 pgs.
Stolte, Office Action, U.S. Appl. No. 11/488,407, dated Apr. 3, 2009, 6 pgs.
Stolte, Office Action, U.S. Appl. No. 12/821,029, dated Apr. 12, 2011, 9 pgs.
Stolte, Office Action, U.S. Appl. No. 12/821,029, dated Feb. 24, 2012, 10 pgs.
Stolte Office Action, U.S. Appl. No. 13/753,452, dated Feb. 26, 2014, 8 pgs.
Stolte, Final Office Action, U.S. Appl. No. 13/753,452, dated Sep. 16, 2014, 10 pgs.
Stolte, Office Action, U.S. Appl. No. 13/753,452, dated Dec. 2, 2014, 6 pgs.
Stolte, Notice of Allowance, U.S. Appl. No. 13/753,452, dated Mar. 23, 2015, 8 pgs.
Stolte, Polaris: A System for Query, Analysis, and Visualization of Multidimensional Relational Databases, Jan. 2002, 14 pgs.
Stolte, Query, Analysis, and Visualization of Hierarchically Structured Data Using Polaris, Jul. 2002, 11 pgs.
Stolte, Specification, U.S. Appl. No. 10/453,834, Jun. 2, 2003, 114 pgs.
Stolte, Visualizing Application Behavior on Superscalar Processors, 1999, 9 pgs.
Savva, ReVision: Automated Classification, Analysis and Redesign of Chart Images, Oct. 16-19, 2011, 10 pgs.
Sun, Articulate: A Semi-automated Model for Translating Natural Language Queries into Meaningful Visualizations, 2010, 184 pgs.
Tableau Software Inc., IPRP, PCT/US07/009810, Oct. 22, 2008, 7 pgs.
Tableau Software Inc., ISR, PCT/US07/009810, Jul. 7, 2008, 8 pgs.
Tableau Software LLC, IPRP, PCT/US06/35300, Mar. 24, 2009, 5 pgs.
Tableau Software LLC, IPRP, PCT/US2005/043937, Jun. 5, 2007, 9 pgs.
Tableau Software LLC, ISR/WO, PCT/US06/35300, Jul. 7, 2008 6 pgs.
Tableau Software LLC, ISR/WO, PCT/US2005/043937, Apr. 18, 2007, 9 pgs.
The Board of Trustees of the Leland Stanford Jr. University, IPER, PCT/US04/18217, Oct. 19, 2006, 4 pgs.
The Board of Trustees of the Leland Stanford Jr. University, IPRP, PCT/US04/30396, Apr. 19, 2007, 5 pgs.
The Board of Trustees of the Leland Stanford Jr. University, ISR/WO, PCT/US04/18217, Feb. 7, 2006, 6 pgs.
The Board of Trustees of the Leland Stanford Jr. University, ISR/WO, PCT/US04/30396, Aug. 24, 2006, 5 pgs.
The Board of Trustees of the Leland Stanford Jr. University, Supplemental EP Search Report, EP 04754739.3, dated Dec. 17, 2007, 4 pgs.
Thearling, Visualizing Data Mining Models, 2001, 14 pgs.
Welling, Visualization of Large Multi-Dimensional Datasets, Aug. 11, 2000, 6 pgs.
Wilkinson, nViZn: An Algebra-Based Visualization System, Mar. 21-23, 2001, 7 pgs.
Wilkinson, Graph-Theoretic Scagnostics, Proceedings of the IEEE Information Visualization, 2005, 8 pgs.
Wilkinson, Statistics and Computing—The Grammar of Graphics, New York, 1999, 418 pgs.

\* cited by examiner

Drop O

| Y/X | ♦ | O | Qi | Qd |
|---|---|---|---|---|
| ♦ | Y=O | Y=O | Y=O | Y=O |
| O | X=O | Y+=O | ?E+=O<br>Y+=O | ?E+=O<br>Y+=O |
| Qi | X=O | ?E+=O<br>X+=O | E+=O | ?E+=O<br>X+=O |
| Qd | X=O | ?E+=O<br>X+=O | ?E+=O<br>Y+=O | E+=O |

Figure 4a

Drop Qd

| Y/X | ϕ | O | Qi | Qd |
|---|---|---|---|---|
| ϕ | E=ϕ?Y=Qd<br>E*=Qd | E*=Qd | Y=Qd | Y=Qd |
| O | E*=Qd | E*=Qd | Y+=Qd | X+=Qd |
| Qi | X=Qd | X+=Qd | E*=Qd | X+=Qd |
| Qd | X=Qd | Y+=Qd | Y+=Qd | XY+=Qd |

| | ϕ | Ot/O |
|---|---|---|
| ϕ | | Y+=Qd |
| O/Ot | X+=Qd | Y=Ot?X+=Qd<br>Y+=Qd |

Figure 4b

Drop Qd on Pane

| Y/X | φ | O | Qi | Qd |
|-----|-----|-----|-----|-----|
| φ | ?E*=Qd | ?E*=Qd | | |
| O | ?E*=Qd | ?E*=Qd | | |
| Qi | | | ?E*=Qd | |
| Qd | | | | ?E*=Qd |

Figure 4c

Drop Qi

Figure 4d

| Y?X | * |
|---|---|
| * | X!=Qd?X+=Qd |

Drop Ot

Figure 4e

| Y/X | * |
|---|---|
| * | X+=Qd |

Drop Ot on Pane

Figure 4f

| Y/X | * |
|---|---|
| * | E+=Ot |

Tentative Drop Od

| Y/X | * |
|---|---|
| * | E←Od |

Figure 4g

Tentative Drop Qm

| Y/X | ɸO |
|---|---|
| ɸO | Y=Qm |

Figure 4h

Tentative Drop Om

| Y/X | ɸO |
|---|---|
| ɸO | E=ψ?E=Qm |

Figure 4i

|  | Data | Agg. | O | Od | Oi | Dates | Rating |
|---|---|---|---|---|---|---|---|
| Text Table | | Yes | | | No | | 1 |
| Heat Map | | Yes | Yes | 1 to 2 | No | | 0 |
| Gantt | | Yes | Yes | < 3 | Qi or relational date | | 10 if No Date |
| Bar (Side-by-side) | | Yes | Yes | Yes | No | | 2 |
| Bar (Stacked) | | Yes | >= 2 | Yes | No | | 3 if O >= 3 |
| Bar (Measure) | | Yes | Yes | >= 2 | No | | 0 |
| Line (Dimension) | | Yes | | Yes | No | Yes | 4 |
| Line (Measure) | | Yes | | Yes | Qi or relational date | | 9 if No Date |
| Circle | | | Yes | Yes | No | | 0 |
| Scatter (Single) | | | | 2 to 4 | No | | 6 |
| Scatter (Matrix) | | | | >= 3 | No | | 7 if O <= 6 |
| Histogram | Relational | Yes | | = 1 | No | | |

Figure 7

(Text Table)

(Heat Map)

(Side-By-Side Bar)

(Stacked Bar)

(Measure Bar)

(Dimension Line)

(Measure Line)

(Dimension Line)

(Gantt)

(Single Scatter)

(Scatter Matrix)

(Histogram)

SYSTEMS AND METHODS FOR RANKING DATA VISUALIZATIONS USING DIFFERENT DATA FIELDS

RELATED APPLICATIONS

This application is a continuation of U.S. patent application Ser. No. 14/549,482, filed Nov. 20, 2014, entitled "Computer Systems and Methods for Automatically Viewing Multidimensional Databases," which is a continuation of U.S. patent application Ser. No. 13/352,137, filed Jan. 17, 2012, entitled "Computer Systems and Methods for Automatically Viewing Multidimensional Databases," which is a continuation of U.S. patent application Ser. No. 11/223,658, filed Sep. 9, 2005, entitled "Computer Systems and Methods for Automatically Viewing Multidimensional Databases," now U.S. Pat. No. 8,099,674, each of which is hereby incorporated by reference in its entirety.

FIELD OF THE INVENTION

This invention relates generally to computer systems and methods for displaying data such as database information. The invention relates specifically to a computer system and method for displaying data clearly and effectively based upon the types of data found in a dataset.

BACKGROUND OF THE INVENTION

Data is more than the numbers, values, or predicates of which it is comprised. Data resides in multi-dimensional spaces which harbor rich and variegated landscapes that are not only strange and convoluted, but are not readily comprehendible by the human brain. The most complicated data arises from measurements or calculations that depend on many apparently independent variables. Data sets with hundreds of variables arise today in many contexts, including, for example: gene expression data for uncovering the link between the genome and the various proteins for which it codes; demographic and consumer profiling data for capturing underlying sociological and economic trends; sales and marketing data for huge numbers of products in vast and ever-changing marketplaces; and environmental measurements for understanding phenomena such as pollution, meteorological changes and resource impact issues. International research projects such as the Human Genome Project and the Sloan Digital Sky Survey are also forming massive scientific databases. Furthermore, corporations are creating large data warehouses of historical data on key aspects of their operations. Corporations are also using desktop applications to create many small databases for examining specific aspects of their business.

One challenge with any of these databases is the extraction of meaning from the data they contain: to discover structure, find patterns, and derive causal relationships. Often, the sheer size of these data sets complicates this task and means that interactive calculations that require visiting each record are not plausible. It may also be infeasible for an analyst to reason about or view the entire data set at its finest level of detail. Even when the data sets are small, however, their complexity often makes it difficult to glean meaning without aggregating the data or creating simplifying summaries.

Among the principal operations that may be carried out on data, such as regression, clustering, summarization, dependency modeling, and classification, the ability to see patterns rapidly is of paramount importance. Data comes in many forms, and the most appropriate way to display data in one form may not be the best for another. In the past, where it has been recognized that many methods of display are possible, it has been a painstaking exercise to select the most appropriate one. However, identifying the most telling methods of display can be intimately connected to identifying the underlying structure of the data itself.

Business intelligence is one rapidly growing area that benefits considerably from tools for interactive visualization of multi-dimensional databases. A number of approaches to visualizing such information are known in the art. However, although software programs that implement such approaches are useful, they are often unsatisfactory. Such programs have interfaces that require the user to select the most appropriate way to display the information.

Visualization is a powerful tool for exploring large data, both by itself and coupled with data mining algorithms. However, the task of effectively visualizing large databases imposes significant demands on the human-computer interface to the visualization system. The exploratory process is one of hypothesis, experiment, and discovery. The path of exploration is unpredictable, and analysts need to be able to easily change both the data being displayed and its visual representation. Furthermore, the analyst should be able to first reason about the data at a high level of abstraction, and then rapidly drill down to explore data of interest at a greater level of detail. Thus, a good interface both exposes the underlying hierarchical structure of the data and supports rapid refinement of the visualization.

Currently, Tableau's software and Microsoft's Excel are examples of visualization software that create views of datasets. Specifically, Tableau Table Drop allows users to drag data fields onto a Tableau view to create a graphical views. When the view was a text table, the behavior was similar to the drags supported by Excel Pivot Tables. For example, dragging a quantitative data type (Q) onto a text table (X=O Y=O T=Q, where "O" stands for ordinal data), would extend the table to put the two measures next to each other (X=O Y=O,Om T=Qm, where "Om" stands for measure ordinal data and "Qm" stands for measure quantitative data). However, Tableu's Table Drop has functionality not found in Excel's Pivot Tables in that it may change the view type of a view when fields are dragged onto the view. For example, dragging a Q onto a bar chart (X=O Y=Q) created a stacked bar chart (X=O Y=Qm C=Om). Or, if there was already a field with a color encoding (X=O Y=Q C=F) in the view, then the software would transform the Q data into Qm data, and would place the measure names on the Level of Detail encoding (X=O Y=Qm C=F L=Om). With scatter plots, the logic was similar, except the transformation of Q to Qm and placement of measure names on the Level of Detail encoding would be triggered if an existing field already had a shape encoding.

In addition to various software programs, the known art further provides formal graphical presentations. Bertin's Semiology of Graphics, University of Wisconsin Press, Madison Wis., (1983), is an early attempt at formalizing graphic techniques. Bertin developed a vocabulary for describing data and techniques for encoding the data into a graphic. Bertin identified retinal variables (position, color, size, etc.) in which data can be encoded. Cleveland (The Elements of Graphing Data, Wadsworth Advanced Books and Software, (1985), Pacific Grove, Calif.; and Visualizing Data, (1993), Hobart Press) used theoretical and experimental results to determine how well people can use these different retinal properties to compare quantitative variations.

Mackinlay's APT system (ACM Trans. Graphics, 5, 110-141, (1986)) was one of the first applications of formal graphical specifications to computer generated displays. APT uses a graphical language and a hierarchy of composition rules that are searched through in order to generate two-dimensional displays of relational data. The Sage system (Roth, et al., (1994), Proc. SIGCHI '94, 112-117) extends the concepts of APT, providing a richer set of data characterizations and forming a wider range of displays. The existing art also provides for the assignment of a mark based upon the innermost data column and row of a dataset (Hanrahan, et al., U.S. patent application Ser. No. 11/005, 652, "Computer System and Methods for Visualizing Data with Generation of Marks"). Heuristically guided searches have also been used to generate visualizations of data (Agrawala, et al., U.S. Pat. No. 6,424,933, "System and Method for Non-Uniform Scaled Mapping").

A drawback with the formal graphical specifications of the art is that they do not provide any guidance to a user as to useful and clear visual formats in which a set of data could be rendered. The rendering of the data is such that there is no analysis to examine the resulting visualization for clarity or usefulness. Further, in the use of heuristic searches (trial-and-error method), the searches fail, leaving the user with the problem of finding clear or useful views. Heuristic algorithms can have complex behavior that creates a poor user experience. When a user does not understand why a heuristic algorithm generates certain views, the algorithm becomes unpredictable to the user and the user will not be inclined to use the algorithm.

Based on the background state of the art, as described herein, what is needed are improved methods and graphical interfaces wherein the initial visualization of data has been determined to be a clear and useful visualization, and this visualization is then automatically presented to the user.

SUMMARY OF THE INVENTION

The present invention provides improved methods for visualizing data.

A first aspect of the invention provides a computer implemented method for automatically and visually displaying a graphical representation of a dataset, comprising: receiving a user selected and ordered plurality of fields; selecting a resulting view for displaying the dataset based on the order of the user selected fields; and displaying the dataset or a transformation of the dataset according to the resulting view. In one embodiment, the dataset is retrieved from a remote database. In another embodiment, rules are used to select the resulting view. In yet another embodiment, the rules are predetermined. In other embodiments, the rules are determined by the user's preferences or usage. In a further embodiment, heuristics are used to select the resulting view.

A second aspect of the invention provides a computer implemented method for automatically and visually displaying a graphical representation of a dataset with a plurality of tuples, comprising: forming a plurality of rated alternative views, each alternative view showing all tuples, or a transformation of all tuples, in the dataset; selecting a resulting view from the plurality of alternative views, based upon a user selected option; and displaying the dataset according to the resulting view. In one embodiment, the dataset is retrieved from a remote database. In another embodiment, rules are used to select the resulting view. In yet another embodiment, the rules are predetermined. In other embodiments, the rules are determined by the user's preferences or usage. In a further embodiment, heuristics are used to select the resulting view. In yet a further embodiment, when the user selected option is a first option, the selecting step further comprises: ranking the plurality of alternative views according to a rating system; and assigning the resulting view as the highest ranked alternative view. In still another embodiment, when the user selected option is a second option, the selecting step further comprises: displaying a list of the alternative views; receiving the user's selection of an alternative view; and assigning the resulting view as the alternative view selected by the user.

A third aspect of the invention provides a computer program product for use in conjunction with a computer system, the computer program product comprising a computer readable storage medium and a computer program mechanism embedded therein, the computer program mechanism for automatically and visually displaying a graphical representation of a dataset, the computer program mechanism comprising: a field receiver for receiving a user selected and ordered plurality of fields; a resulting view selector for selecting a resulting view for displaying the dataset based on the order of the user selected fields; and a dataset displayer for displaying the dataset or a transformation of the dataset according to the resulting view. In one embodiment, the dataset is retrieved from a remote database. In another embodiment, rules are used to select the resulting view. In yet another embodiment, the rules are predetermined. In other embodiments, the rules are determined by the user's preferences or usage. In a further embodiment, heuristics are used to select the resulting view.

A fourth aspect of the invention provides a computer program product for use in conjunction with a computer system, the computer program product comprising a computer readable storage medium and a computer program mechanism embedded therein, the computer program mechanism for automatically and visually displaying a graphical representation of a dataset with a plurality of tuples, the computer program mechanism comprising: an alternative view former for forming a plurality of rated alternative views, each alternative view showing all tuples, or a transformation of all tuples, in the dataset; a resulting view selector for selecting a resulting view from the plurality of alternative views, based upon a user selected option; and a dataset displayer for displaying the dataset according to the resulting view. In one embodiment, the dataset is retrieved from a remote database. In another embodiment, rules are used to select the resulting view. In yet another embodiment, the rules are predetermined. In other embodiments, the rules are determined by the user's preferences or usage. In a further embodiment, heuristics are used to select the resulting view. In yet a further embodiment, when the user selected option is a first option, the resulting view selector further comprises: an alternative view ranker for ranking the plurality of alternative views according to a rating system; and a view assignor for assigning the resulting view as the highest ranked alternative view. In still another embodiment, when the user selected option is a second option, the resulting view selector further comprises: a list displayer for displaying a list of the alternative views; a selection receiver for receiving the user's selection of an alternative view; and a view assignor for assigning the resulting view as the alternative view selected by the user.

A fifth aspect of the invention provides a computer system for automatically and visually displaying a graphical representation of a dataset, the computer system comprising: a central processing unit; a memory, coupled to the central processing unit, the memory storing: the dataset; a programming module comprising, comprising: instructions for receiving a user selected and ordered plurality of fields; instructions for selecting a resulting view for displaying the dataset based on the order of the user selected fields; and instructions for displaying the dataset or a transformation of the dataset according to the resulting view. In one embodiment, the dataset is retrieved from a remote database. In another embodiment, rules are used to select the resulting view. In yet another embodiment, the rules are predetermined. In other embodiments, the rules are determined by the user's preferences or usage. In a further embodiment, heuristics are used to select the resulting view.

A sixth aspect of the invention provides a computer system for automatically and visually displaying a graphical representation of a dataset with a plurality of tuples, the computer system comprising: a central processing unit; a memory, coupled to the central processing unit, the memory storing: the dataset; a programming module comprising: instructions for forming a plurality of rated alternative views, each alternative view showing all tuples, or a transformation of all tuples, in the dataset; instructions for selecting a resulting view from the plurality of alternative views, based upon a user selected option; and instructions for displaying the dataset according to the resulting view. In one embodiment, the dataset is retrieved from a remote database. In another embodiment, rules are used to select the resulting view. In yet another embodiment, the rules are predetermined. In other embodiments, the rules are determined by the user's preferences or usage. In a further embodiment, heuristics are used to select the resulting view. In yet a further embodiment, when the user selected option is a first option, the instructions for selecting further comprises: instructions for ranking the plurality of alternative views according to a rating system; and instructions for assigning the resulting view as the highest ranked alternative view. In still another embodiment, when the user selected option is a second option, the instructions for selecting further comprises: instructions for displaying a list of the alternative views; instructions for receiving the user's selection of an alternative view; and instructions for assigning the resulting view as the alternative view selected by the user.

BRIEF DESCRIPTION OF THE DRAWINGS

FIGS. 4a-4i are rules whereby a field may be added to an existing view or whereby a field may be used as the only field in a view.

FIG. 7 is a table showing the criteria for forming views of a dataset and a rating system for one embodiment of the present invention.

Like reference numerals refer to corresponding parts throughout the several views of the drawings.

DETAILED DESCRIPTION OF THE INVENTION

The present invention provides methods, computer program products, and computer systems for automatically providing a user with a clear and useful view of a dataset. In a typical embodiment, the present invention builds and displays a view of a dataset as a user adds fields to the dataset or as a dataset is accessed, such that the view is clear and useful, and is automatically presented to the user. An advantage of the present invention is that data is presented in a clear and useful form automatically.

The present invention operates on a set of data, called a dataset, that are made up of tuples. As one skilled in the art will realize, the dataset can be a relational database, a multidimensional database, a semantic abstraction of a relational database, or an aggregated or unaggregated subset of a relational database, multidimensional database, or semantic abstraction. Fields are categorizations of data in a dataset. A tuple is an item of data (such as a record) from a dataset, specified by attributes from fields in the dataset. A search query across the dataset will return one or more tuples. Fields contain data that are of particular types, and each field is of a particular type. These types include:

| Data Type | Symbol |
| --- | --- |
| Ordinal | O |
| Ordinal time (date) | Ot |
| Dependent ordinal (categorical measure) | Od |
| Measure names | Om |
| Quantitative | Q |
| Independent Quantitative (dimension) | Qi |
| Dependent Quantitative (measure) | Qd |
| Measure values | Qm |
| Quantitative time | Qt |
| Quantitative position | Qx |

Measure names may include an ordinal field whose domain is the name of one or more Qd fields. Measure values may include a dependent quantitative field whose domain and values are the blending of the Qd fields whose names appear in the domain of measure names.

A view is a visual representation of a dataset or a transformation of that dataset. Text table, bar chart, and scatter plots are all examples of types of views. Views contain marks that represent one or more tuples in a dataset. In other words, marks are visual representations of tuples in a view. A mark is typically associated with a type of graphical display. Some examples of views and their associated marks are as follows:

| View Type | Associated Mark |
| --- | --- |
| Table | Text |
| Scatter Plot | Shape |
| Bar Chart | Bar |
| Gantt Plot | Bar |
| Line Graph | Line Segment |
| Circle Graph | Circle |

Figure 1:
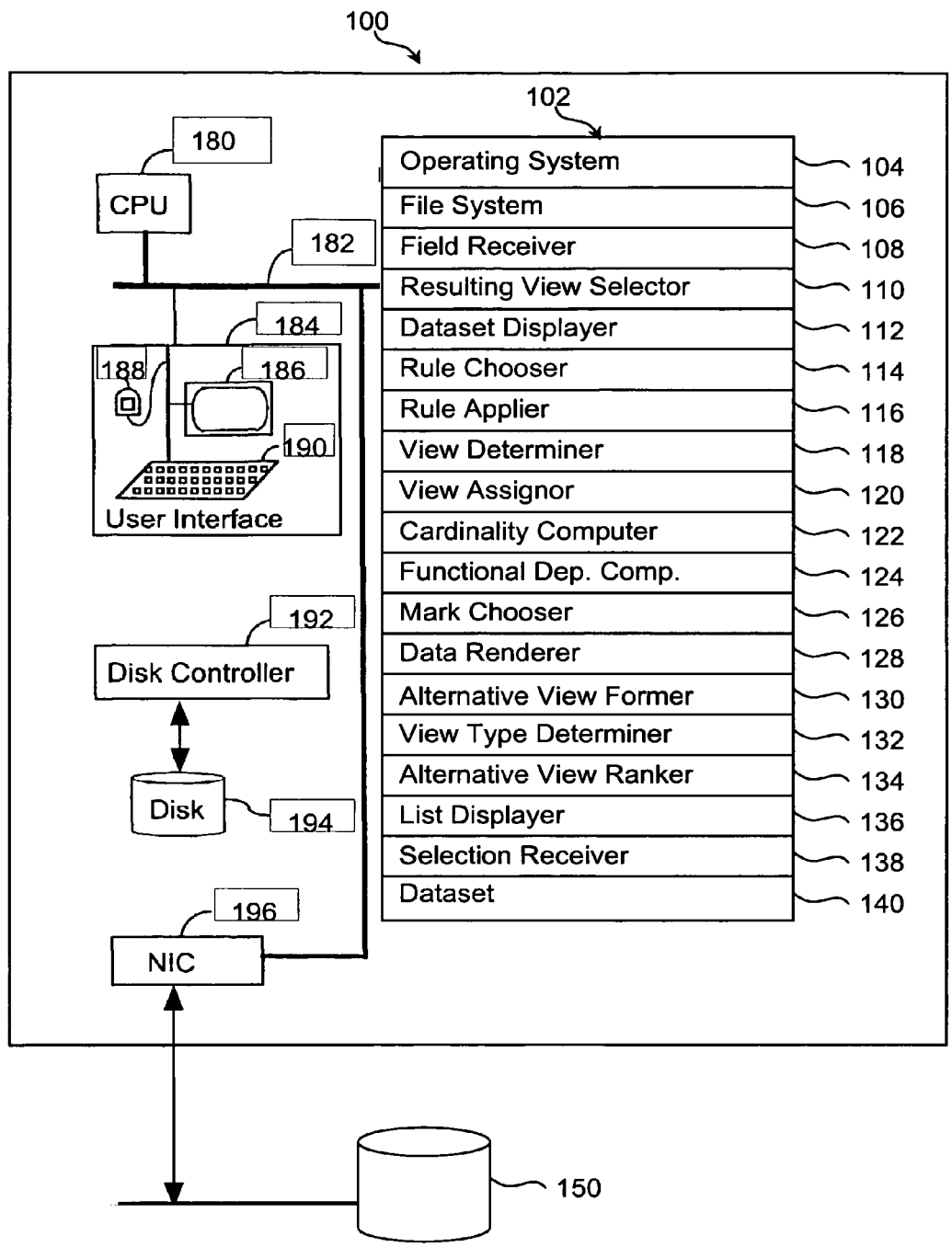
FIG. 1 is an illustration of a computer system that facilitates the visualization of a dataset in a clear and useful form.

FIG. 1 is an illustration of a computer system that facilitates the visualization of a dataset in a clear and useful form. System 100 includes memory 102, CPU 180, user interface 184, storage unit 194, disk controller 192, and bus 182 that connects all of system 100's elements together. System 100 may also have network connection 196 for communication with other systems on a network. System 100 also includes memory 102, which stores operating system 104, file system 106, as well as various other modules related to the present invention. Additionally, memory 102 may also store dataset 140, which contains tuples. System 100 may also be connected to database 150 where a dataset may be retrieved and stored in memory 102. Memory 102 also stores computer program mechanisms that are necessary to some embodiments of the present invention.

Figure 2:
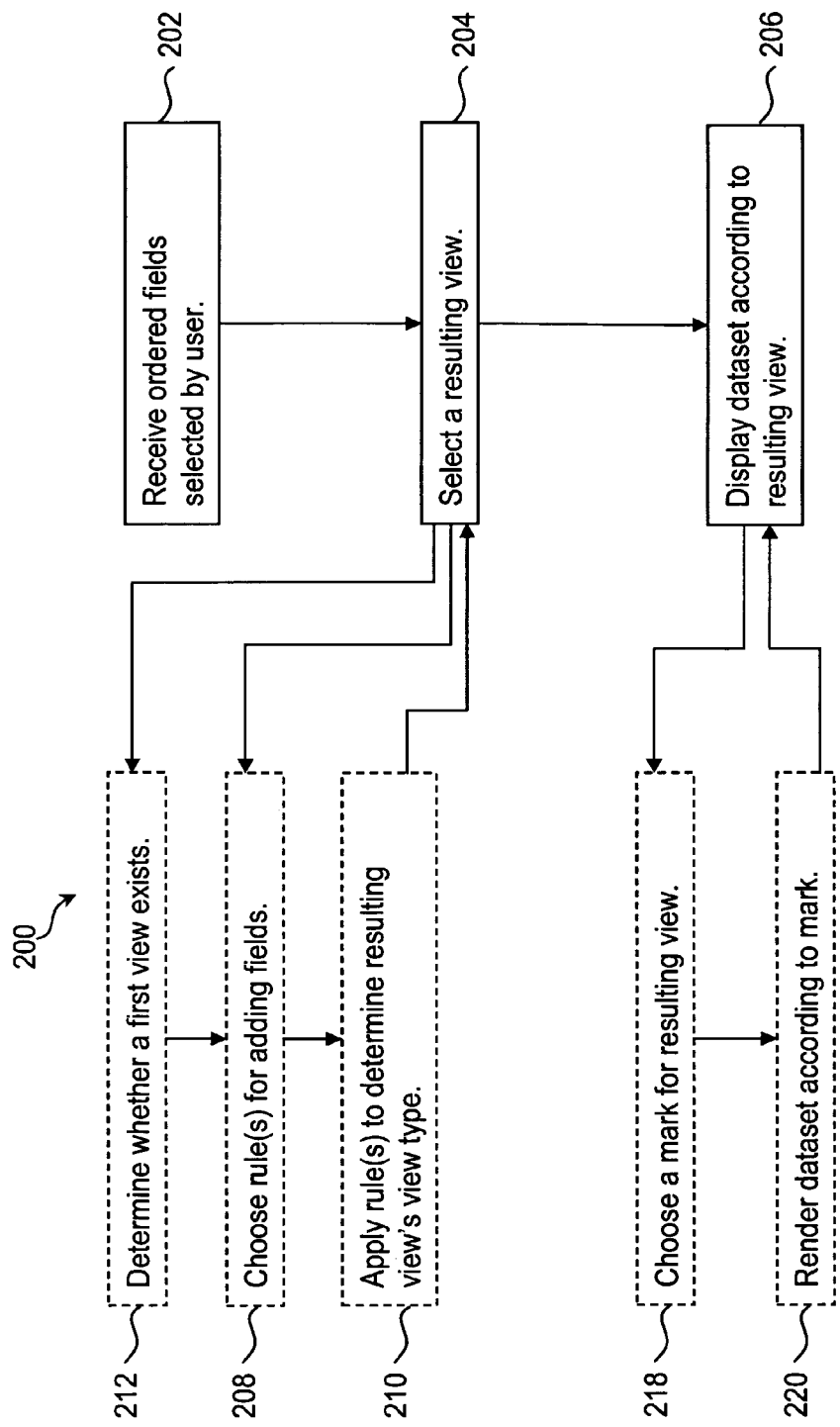
FIG. 2 is a flowchart of the steps through which a system proceeds in one embodiment of the present invention.

In FIG. 2, flowchart 200 describes the steps through which a system proceeds in one embodiment of the invention. At step 202, ordered fields selected by a user are received. A resulting view is selected at step 204, and the dataset is displayed at step 206 according to the resulting view.

The computer system modules used to perform this embodiment of the invention are shown in FIG. 1. Field receiver 108 performs step 202 by receiving ordered fields selected by the user. Resulting view selector 110 performs step 204 and selects a resulting view. Dataset displayer 112 performs step 206 and displays the dataset according to the resulting view.

According to one embodiment of the invention, resulting view selector 110 selects the resulting view by choosing rule(s) for adding the user selected ordered fields (step 208). This is accomplished by rule chooser 114. Rule applier 116 then applies the rule(s) to determine the resulting view's view type (step 210). In another embodiment of the invention, before rule chooser 114 chooses rule(s), view determiner 118 determines whether a first view exists (step 212). In yet another embodiment of the invention, the dataset is displayed in step 206 when mark chooser 126 chooses a mark for the resulting view (step 218), and dataset renderer 128 renders the dataset according to the mark (step 220).

FIGS. 4a-4i show sets of rules that are associated with adding (or "dropping") fields with particular data types. The field may be the only field in a view, or the field may be in addition to fields already in an existing view. When dropping a field, the field is added either as a column or a row, or it may be encoded. Encodings include color, size, and shape to represent a value. For example, red may represent all values between 1 and 10. The following convention is used for operators in the rules shown in FIGS. 4a-4i ("E" designates encoding):

| Operator | Limitations |
| --- | --- |
| = Assign field to a clause | Left hand side is a column or row |
| += Add field to the end of the clause (some rearrangements may occur) | Right hand side must be O or Qd |
| *= Blend field with column or row (blend Qd with first E accepting/containing a Qd). The blend will result in Qm being on column or row, and an Om being added to the view. | Right hand side must be Qd |
| ? Guard the action. Only add if the column or row accepts the field and the cardinality of the field is less than the cardinality associated with the column or row. | Unary |

The sets of rules are organized first by the type of the field that is dropped (e.g. O or Qd), and then by the type of the view that the field is being dropped onto. The rules are further broken down by the type of the view. The type of a view depends on their innermost row and column. For example, OO is a view with ordinal fields in the row and column; OQ is a view with an ordinal field in the row and a quantitative field in the column; and ϕ is an empty view with no fields. For each type of field being dropped, a rule table is shown containing the rules for each type of view into which the field is being dropped. The columns of the rule tables represent the contents of the innermost field on the column (X), and the rows of the rules table the innermost field on the row (Y).

In step 208, rule(s) for adding the user selected field's data type are chosen. For example, if a user selected field is an ordinal, then the set of rules in FIG. 4a would be used. Or, if a user selected field is an independent quantitative, then the set of rules in FIG. 4d would be used. If in step 212 view determiner 118 determines that no first view exists, then rule chooser 114 would choose the rule in row 1 column 1 of FIG. 4a as the rule in step 208. If in step 212 view determiner 118 determines that a first view exists, and the first view contains an independent quantitative field in the innermost column and an independent quantitative field in the innermost row of the first view, then rule chooser 114 would select the rule in row 3 column 3 of FIG. 4a as the rule in step 208. Finally, in step 210, rule applier 116 applies the rule selected by rule chooser 114. If no first view exists, then the resulting view will contain a single column (Y=O). If the first view was of the QiQi type, then the resulting view will contain an encoded field (E+=O).

Notes for FIG. 4a:
E+=O adds to shape then color then Z. The O is always added.
?E+=O conditionally adds to shape then color. O is only added if the encoding is empty. And if the cardinality of the field is less than the cardinality supported by the encoding.
In the above rules, the shape shelf is only considered if the mark is shape.
Nothing is dropped on an encoding if the mark is a bar. That is, the guarded rule always fails. We try to avoid stacking of bars (more generally, nothing is dropped if we are stacking because we don't know if the field supports stacking (is additive)).
The Qi row represents Qi on the Y axis. These cases are rare because Qi is normally placed on the X axis.

Notes for FIG. 4b:
The guard E=ϕ? checks whether the encoding (text or size) is empty.
E*=Qd first tries to add to text then size then color then Z.
?E*=Qd first tries to add to text then size.
In the above rules, the text shelf is only considered if the mark is text.
An encoding accepts the Qd if it is empty or already contains a Qd. It does not accept the Qd if it contains an O.
If the field accepting the encoding contains a Qd or a Qm, then the new Qd is blended with the contents to produce a Qm. If an Om is generated by the blend, it is added to the column shelf if that shelf is empty, otherwise it is added to the row shelf.
The Ot rules take precedence over the O rules.
The guard Y=Ot? checks whether the Y shelf contains an Ot.

The Ot rows represent Ot on the Y axis. This should be rare since best practices dictate that Ot should be on the X axis.

XY+=Qd converts to a matrix of scatterplots. All Qds on the rows and columns are the same.

Conversions for FIG. 4b:

The ϕϕ rules will drop Qd on the Y axis, unless the text or size encoding contains a Qd. That is, if we are building a text table, continue to build a text table; otherwise make a chart.

The OO rules continue to add measures to the text table.

The Qiϕ and QiO rules create QiQd (line) graphs.

The ϕQd rules create QdQd scatterplots.

The OQd rules create stacked charts.

The QdQd rule creates a matrix of scatterplots.

Notes for FIG. 4c:

This set of rules is used when dropping a Qd on a pane. If no match is found, then we use the more general rules for dropping a Qd. The goal is to try to add the Qd to the encodings when Qd is dropped on the pane.

The guarded version of the *=operator only adds Qd to text or size. If it can't, that operator is not applied.

Notes for FIG. 4d:

Always drop Qi on the X axis.

But don't do it if the X axis contains a Qd.

If there is an existing Qi, then the Qi's are concatenated.

Notes for FIG. 4e:

Always drop Ot on the X axis.

If there is an existing Qi or Qd, then move the Ot leftward until all of the Q's are to the right.

Notes for FIG. 4g:

The +=operator only adds Od to shape or color. If it can't, that operator is not applied.

If no match is found, then we don't add the Od. We really want to put Od on an encoding.

Notes for FIG. 4i:

Do nothing if a Q is already being used.

Apply Qd rules if one of the O's is an Ot.

Adding a Qd makes a bar chart.

Adding an Om makes a text table.

The order in which fields are added affect the view type of the resulting view. For example, if a measure data type field is added to an empty view, and is subsequently followed by a dimension data type field, the resulting view will be a bar chart. However, if a measure data type field is added to an empty view subsequent to a dimension data type field, then the resulting view will be a text table. The resulting view's view type is thusly selected based upon a set of rules. The view type is then assigned to the resulting view and the view is then populated with data from the dataset. In one embodiment, the set of rules are predetermined. In another embodiment, the set of rules are based upon a user's preferences or actual usage. For example, a user may be given the opportunity to designate the best view type for various sequences of the addition of fields to views. Or, after the visual plot is populated and rendered for the user, the user is allowed to choose a different rendering. The user's choice as to the ultimate resulting view, if recorded, may indicate the user's preference for what view type the user considers the clear and/or useful. In yet another embodiment, heuristics may be used instead of a set of rules for selecting a resulting view.

In one embodiment, the cardinalities of the fields in the resulting view are computed and are considered in determining how the user selected fields are added. In set theory, cardinality is the size of a set. In the present invention, cardinality refers to the number of distinct instances that are associated with a field's type. For example, if a field type is "States of America", then the cardinality of such a field would be 50.

Figure 5A:
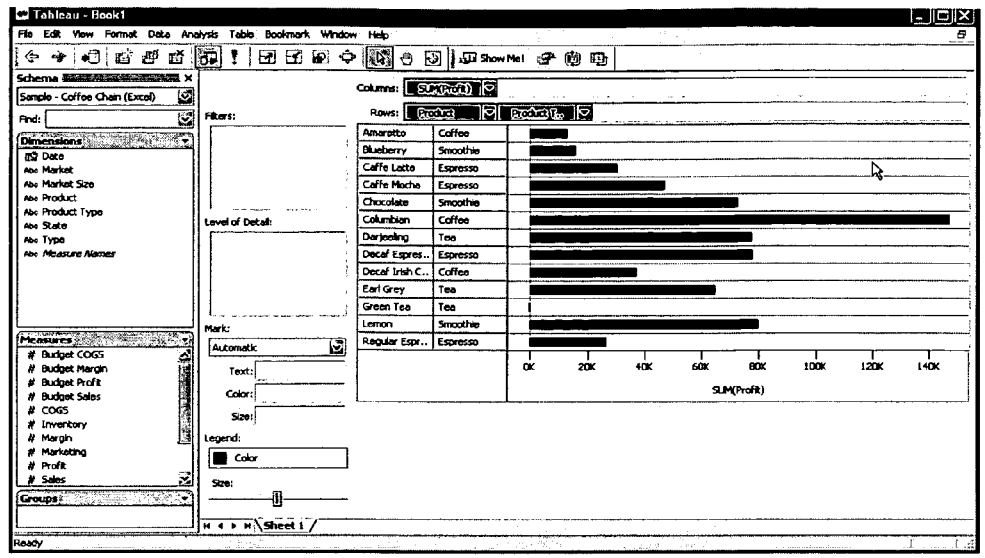
FIGS. 5a-5c are examples of different views of a single dataset.
Figure 5B:
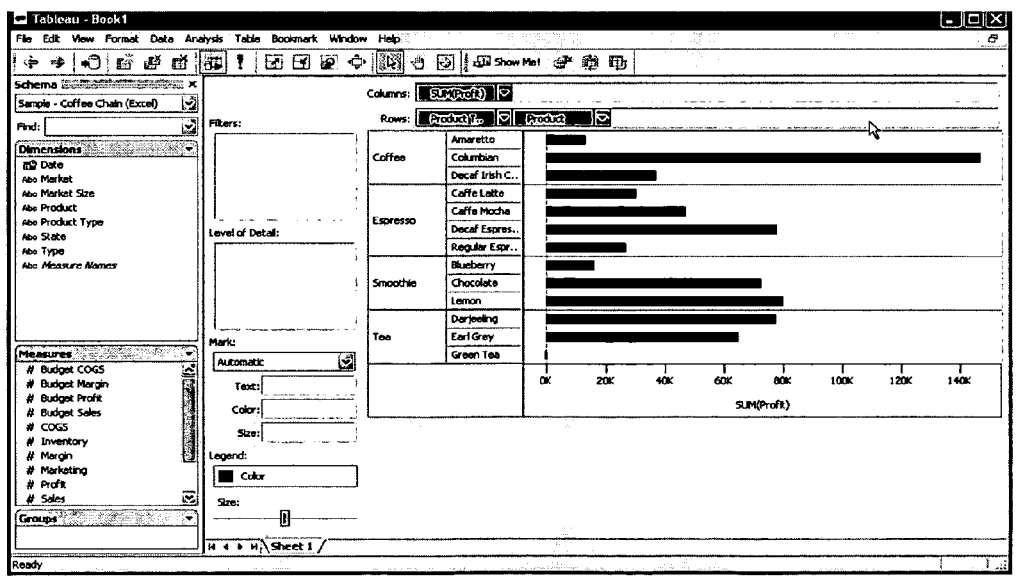
Figure 5C:
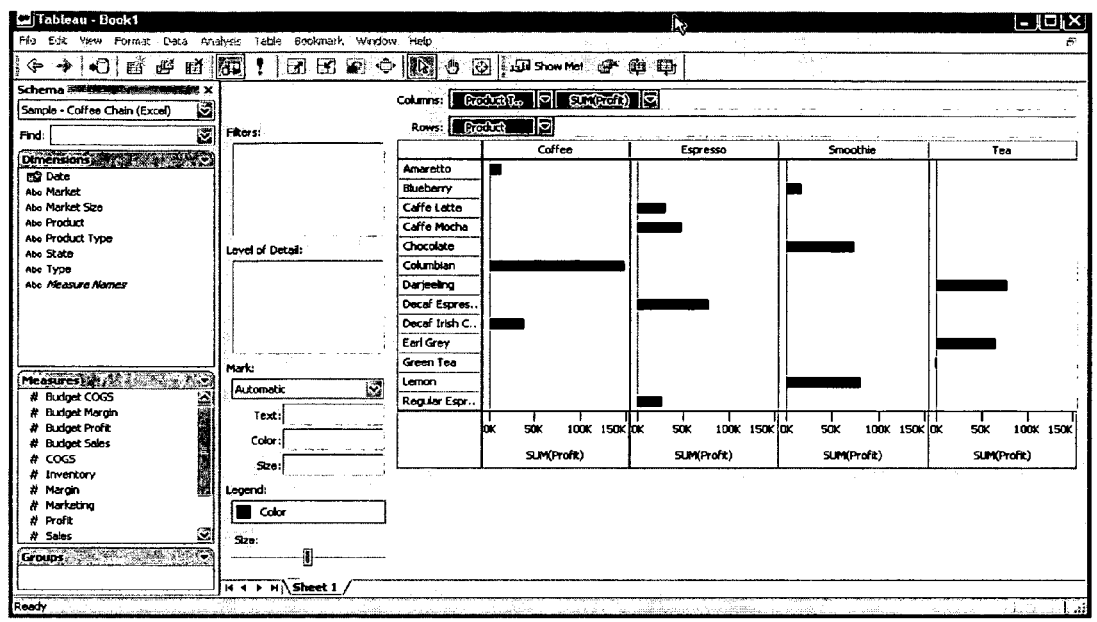

In another embodiment, the functional dependency of the fields in the resulting view are computed and are considered in determining how the user selected fields are added. Functional dependency refers to the determination of one field by another field. For example, if one field is of the type "States of America," and a second field is "Inches of Rainfall of the States of America," then the second field depends upon the first. Another example is shown in FIGS. 5a-5c. Referring to FIGS. 5a-5c, there is a functional dependency from the Product field to the Product Type field because each product has a unique product type. This can be seen in FIG. 5a because each product (in the column where the product field resides) has a single product type (in the column where the product type field resides) to its right. When the columns are reversed in FIG. 5b, it is apparent that there is no functional dependency from the Product Type field to the Product Field because each product type has multiple products. Finally, when the fields that form a functional dependency are placed in both rows and columns (FIG. 5c), the resulting view contains much empty space, which makes the resulting view less effective.

In yet another embodiment, in the application of the selected rule to populate the resulting view with data from the dataset, a mark is chosen for the resulting view's view type and the data from the dataset is rendered according to the mark. This is shown in FIG. 2, where, in step 218, mark chooser 126 chooses a mark for the resulting view, and data renderer 128 renders the dataset according to the mark in step 220.

Figure 3B:
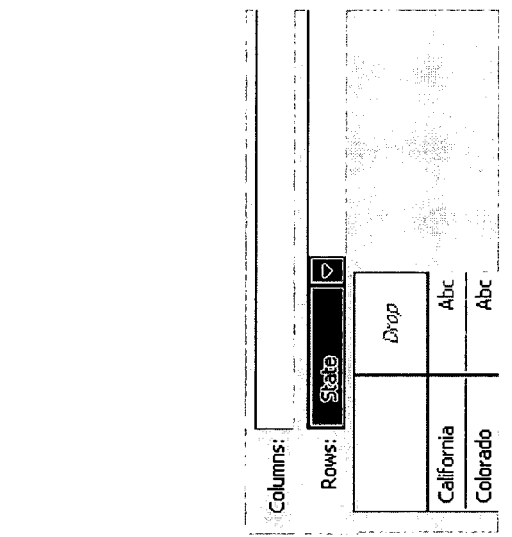
FIGS. 3a and 3b are illustrations of one way of presenting an embodiment of the present invention to a user.
Figure 3A:
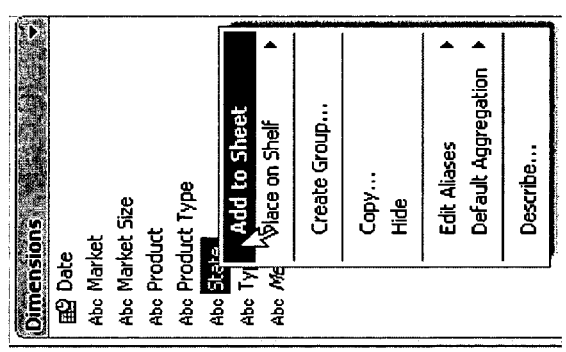

FIGS. 3a and 3b show ways of operating an embodiment of the present invention. A user may drag a new field from a list of available fields and drop the field onto a view. Another way of operating an embodiment of the present invention is for the user to double click on a new field from a list of available fields. This automatically adds the new field to an existing view or automatically forms a new view if there is not an existing view. Other ways of adding or dropping fields include double clicking on a field, selecting fields, typing field names, and creating a specification for a set of fields using statistical analysis, historical analysis, or heuristic algorithms.

Figure 6A:
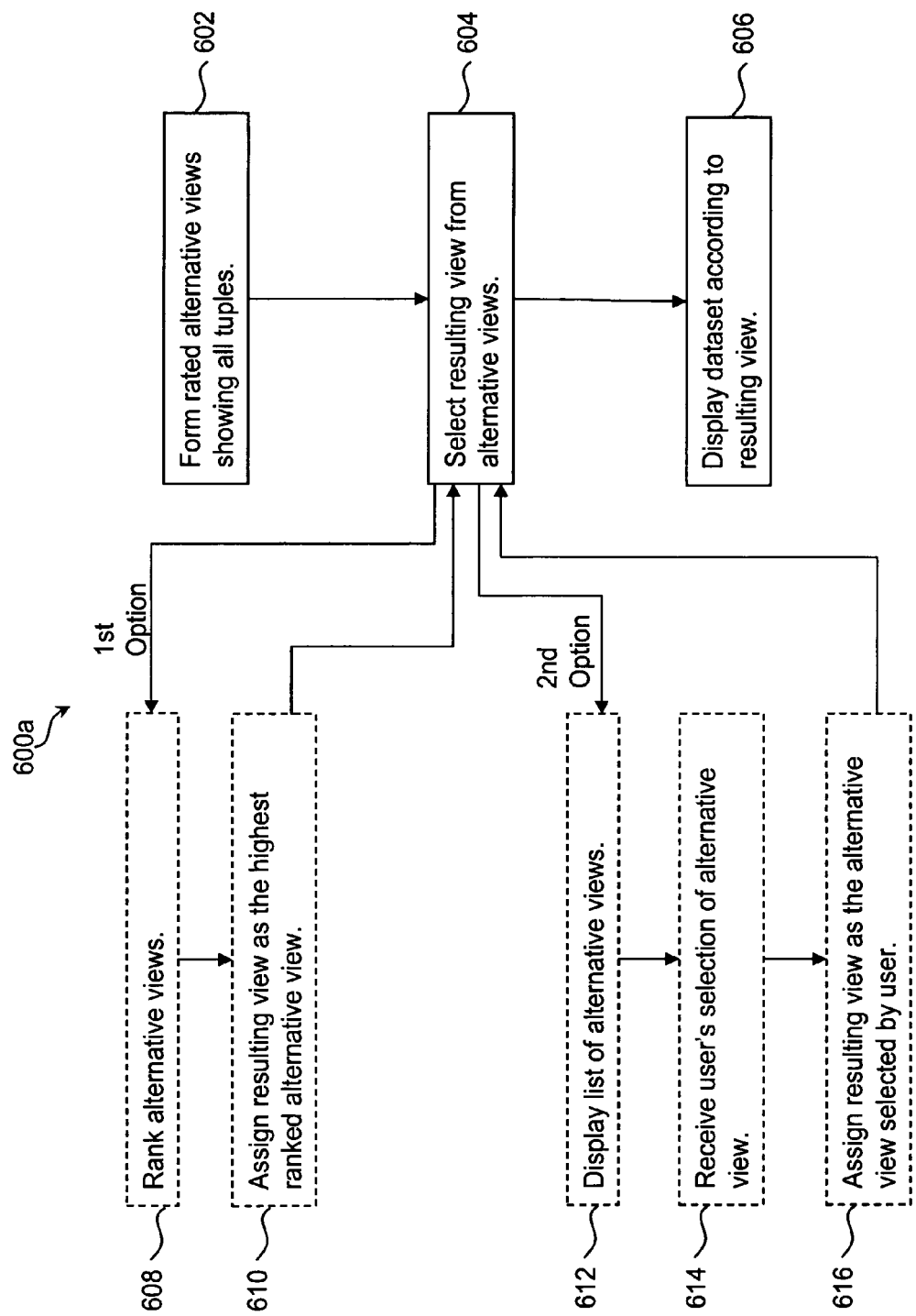
FIGS. 6a and 6b are flowcharts of the steps through which a system proceeds in another embodiment of the present invention.
Figure 6B:
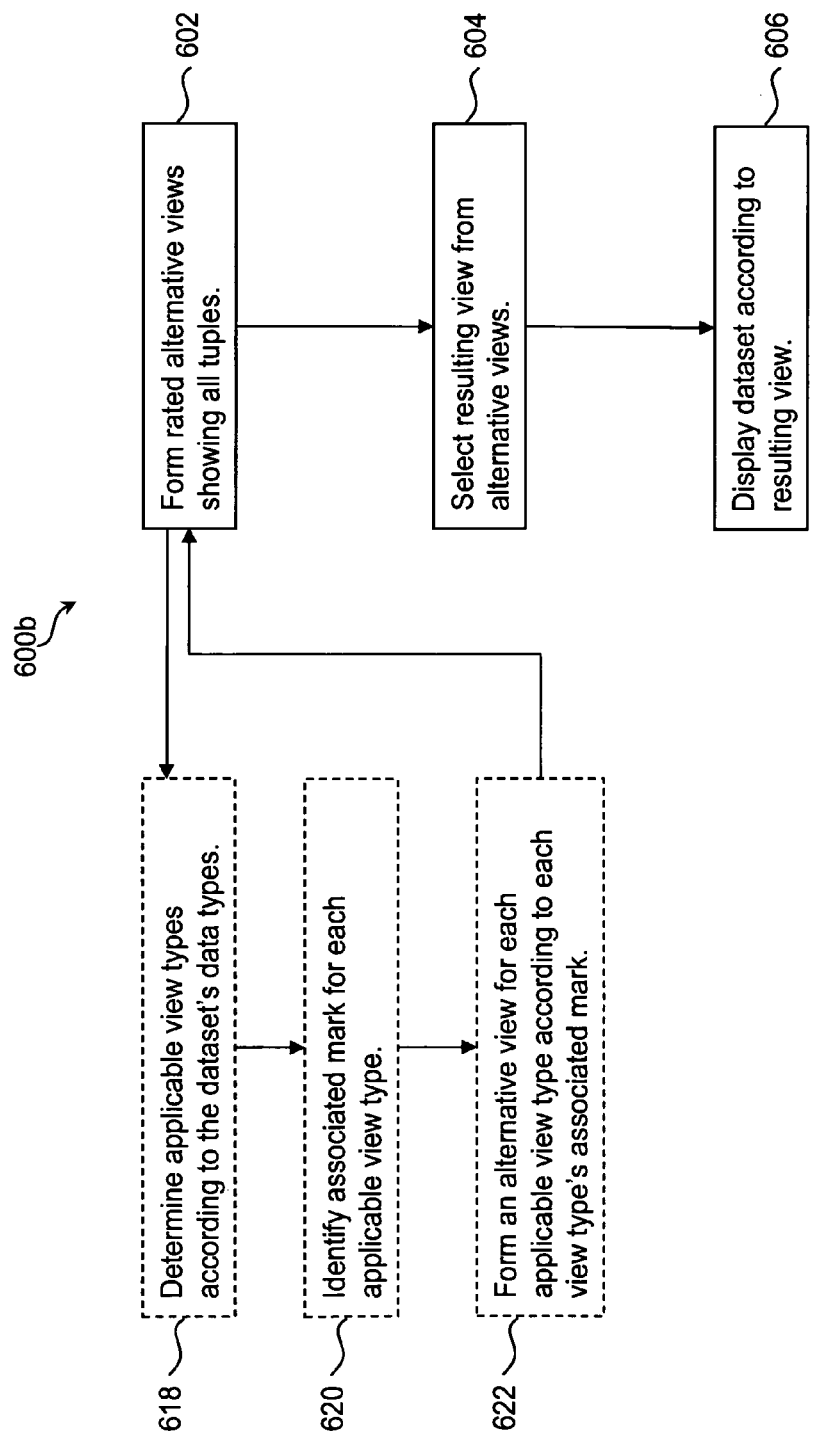

Now, referring to FIG. 6a a flowchart is provided for the steps through which a system proceeds in another embodiment of the present invention. First, alternative view former 130 forms alternative views of the tuples of the dataset (step 602). Resulting view selector 110 then selects a resulting view from the alternative views (step 604). Finally, dataset displayer 112 displays the dataset according to the resulting view (step 606).

In another embodiment, alternative views are formed based upon a set of criteria. FIG. 7 is a table showing the criteria for forming alternative views of a dataset and a rating system for one embodiment of the present invention. For example, if all the data in a dataset is aggregated and does not contain any independent quantitative data, then one of the possible views is a text table as determined by the first rule. Its rating is 1 meaning that it will only be the highest ranking view if other views such as Line (Measure), which was a higher rating of 9, is not applicable to the selected fields. As one skilled in the art will realize, these ratings could also be based on other criteria such as user preference, usage patterns, and statistical analysis of the data.

In one embodiment, if the user selected a first option, then the alternative views are ranked according to a rating system by alternative view ranker 134 in step 608. View assignor 120 then assigns the resulting view as the highest ranked alternative view at step 610. Dataset displayer 112 then displays the dataset according to the resulting view in step 606. For example, if all the data in a dataset is aggregated and does not contain any independently quantitative data, then alternative views of all the view types listed in FIG. 7 are generated at step 602. Then, at step 604, the text table alternative view is selected to be the resulting view, and the dataset is displayed as a text table in step 606. In another embodiment, in accomplishing step 602 (forming rated alternative views showing all tuples), view determiner 118 determines applicable view types according to the dataset's data types. Mark chooser 126 then identifies an associated mark for each applicable view type at step 620, which is then used to form alternative views for each applicable view type at step 622.

In another embodiment, if the user selected a second option, then a list of alternative views would be displayed by list displayer 136 at step 622 for the user's selection. After the user's selection is received at step 624 by selection receiver 138, the resulting view is assigned as the alternative view that the user selected by view assignor 120 at step 616, and dataset displayer 112 then displays the dataset according to the resulting view in step 606.

In yet another embodiment of the invention, cardinality computer 122 computes the cardinality of the fields in the plurality of tuples when forming the alternative views. In a further embodiment, functional dependency computer 124 computes the functional dependency of the fields in the plurality of tuples when forming the alternative views.

Figure 8A:
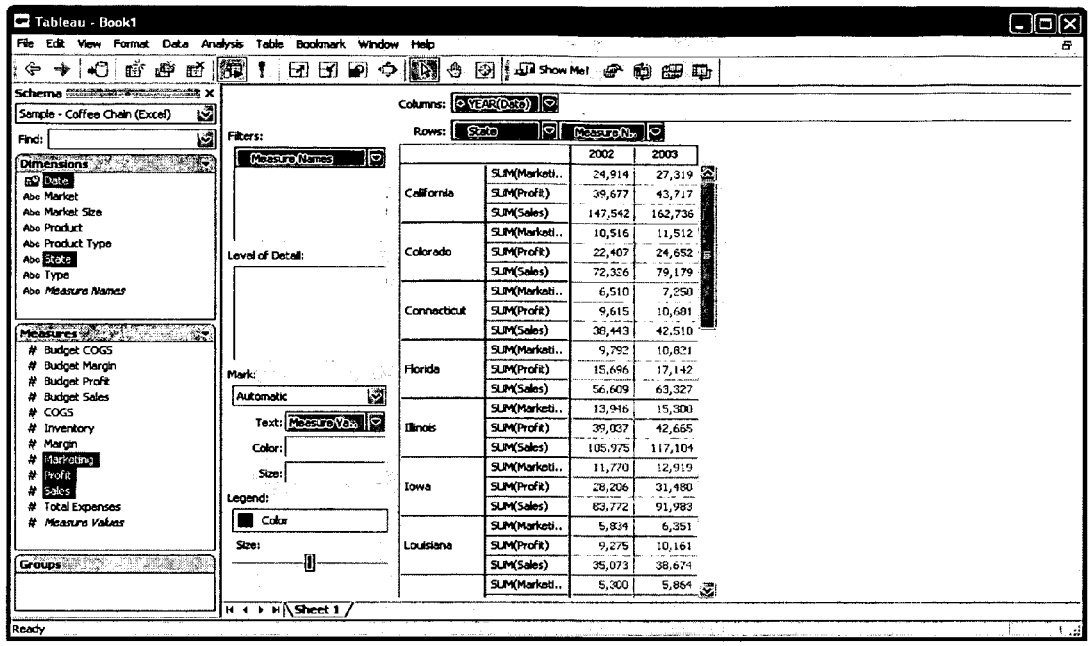
FIGS. 8a-8l are resulting views, based upon an embodiment of the present invention.

FIG. 8*a* shows a rendering of the data in a dataset in an resulting view where either the highest ranked view type was a text table, or the user selected the alternative text table view. The dataset must include only aggregated data and no independently quantitative data.

Figure 8B:
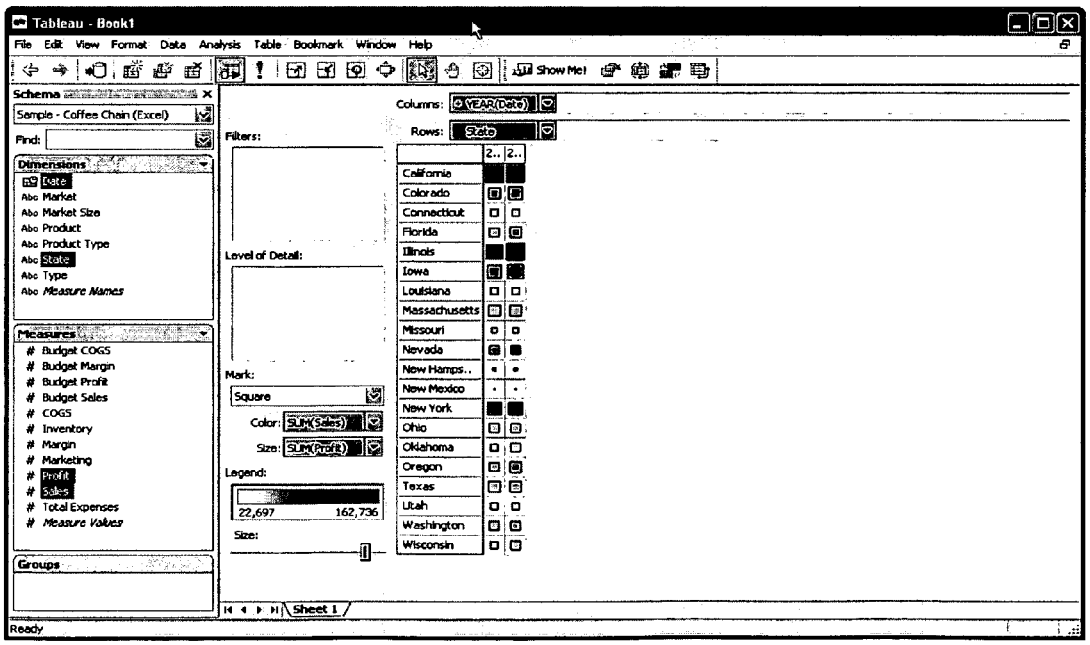

FIG. 8*b* shows a rendering of the data in a dataset in an resulting view where either the highest ranked view type was a heat map, or the user selected the alternative heat map view. The dataset must include only aggregated data, at least one field of ordinal data, one to two fields of dependant quantitative data, and no independent quantitative data.

Figure 8C:
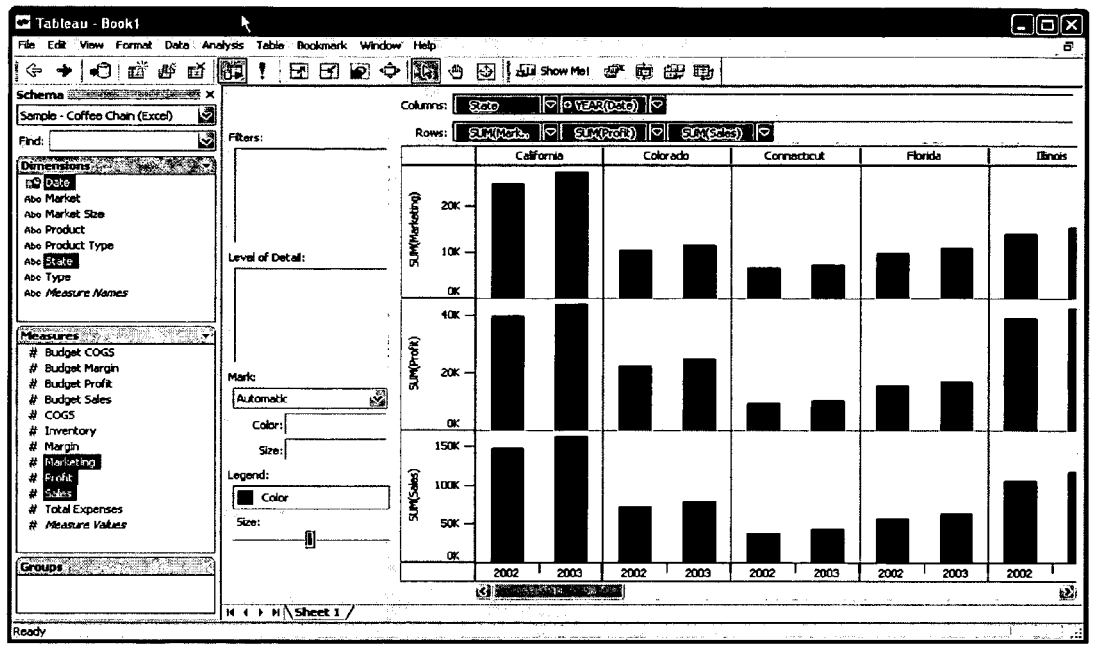

FIG. 8*c* shows a rendering of the data in a dataset in an resulting view where either the highest ranked view type was a side-by-side bar chart, or the user selected the alternative side-by-side bar chart view. The dataset must include only aggregated data, at least one field of ordinal data, at least one field of dependant quantitative data, and no independent quantitative data.

Figure 8D:
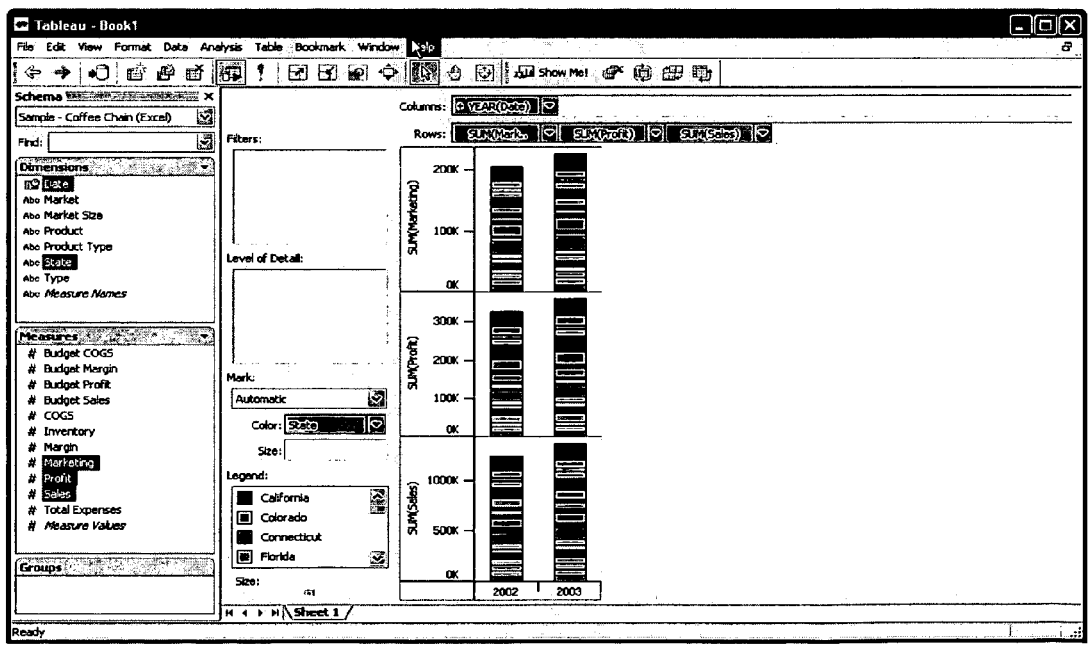

FIG. 8*d* shows a rendering of the data in a dataset in an resulting view where either the highest ranked view type was a stacked bar chart, or the user selected the alternative stacked bar chart view. The dataset must include only aggregated data, at least two fields of ordinal data, at least one dependent quantitative data, and no independent quantitative data.

Figure 8E:
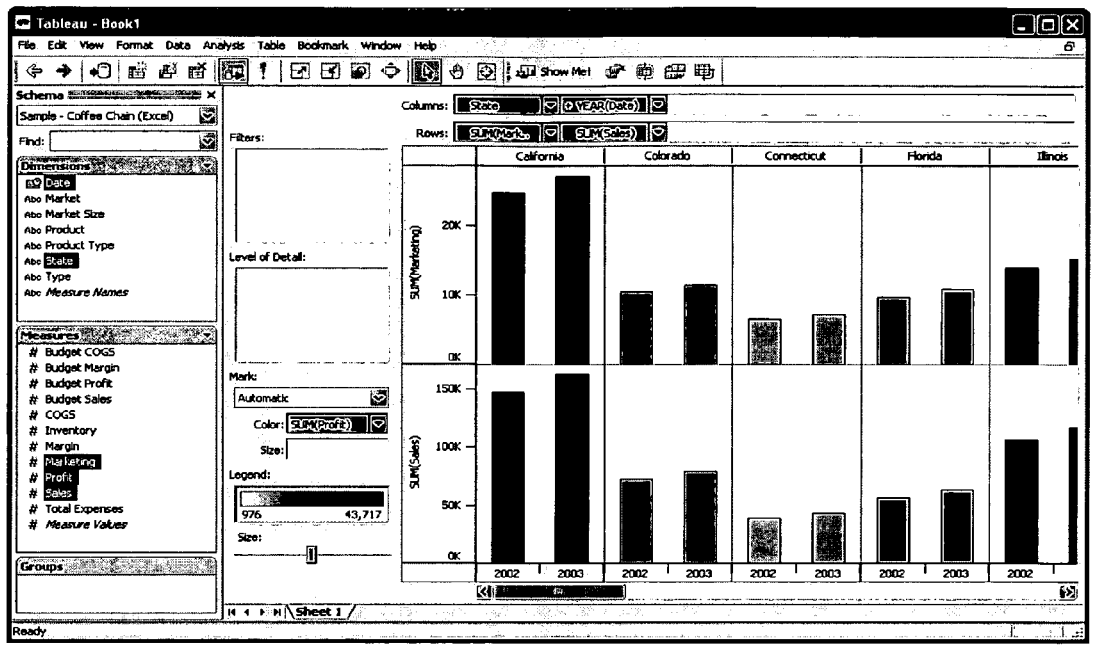

FIG. 8*e* shows a rendering of the data in a dataset in an resulting view where either the highest ranked view type was a measure bar chart, or the user selected the alternative measure bar chart view. The dataset must include only aggregated data, at least one field of ordinal data, at least two fields of dependent quantitative data, and no independent quantitative data.

Figure 8F:
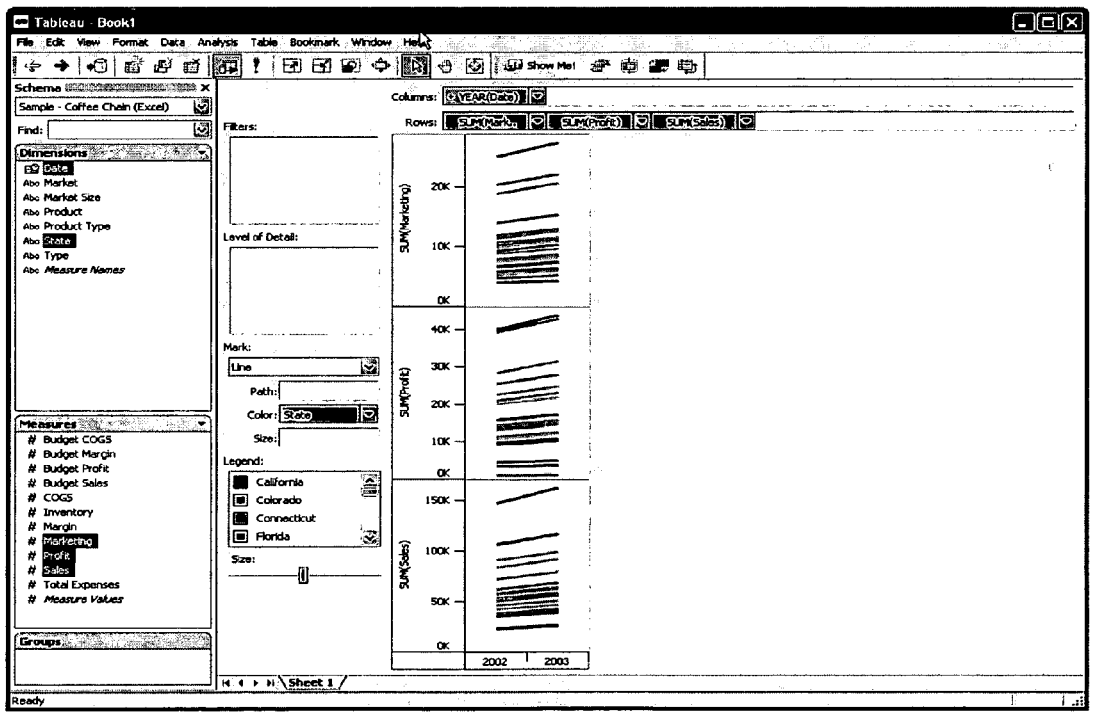

FIG. 8*f* shows a rendering of the data in a dataset in an resulting view where either the highest ranked view type was a dimension line graph, or the user selected the alternative dimension line graph view. The dataset must include only aggregated data, at least one field of dependent quantitative data, at least one field of dates, and no independent quantitative data.

Figure 8G:
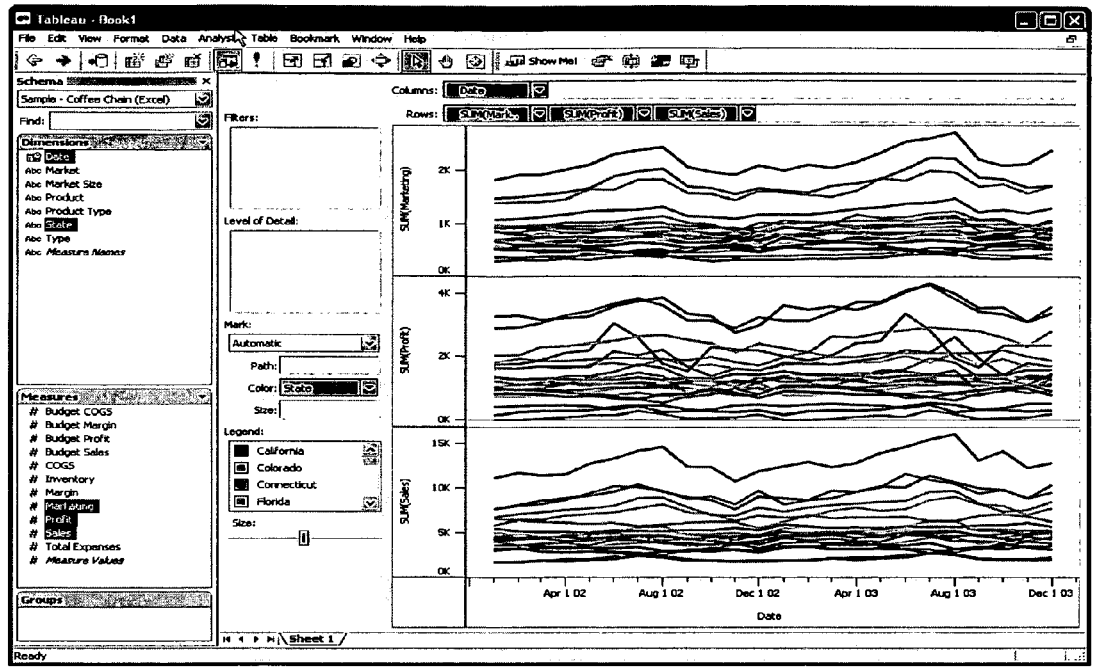

FIG. 8*g* shows a rendering of the data in a dataset in an resulting view where either the highest ranked view type was a measure line graph, or the user selected the alternative measure line graph view. The dataset must include only aggregated data, at least one field of dependent quantitative data, and at least one field of independent quantitative data or dates.

Figure 8H:
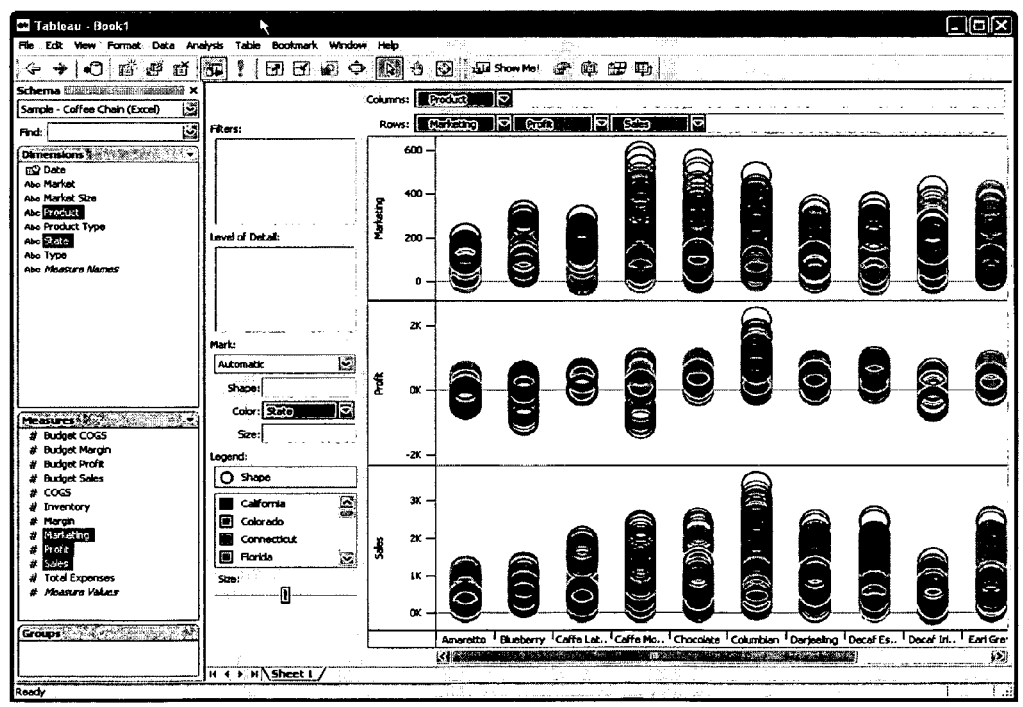

FIG. 8*h* shows a rendering of the data in a dataset in an resulting view where either the highest ranked view type was a circle graph, or the user selected the alternative circle graph view. The dataset must not include any aggregated data or independent quantitative data, and must include at least one field each of ordinal and dependent quantitative data.

Figure 8I:
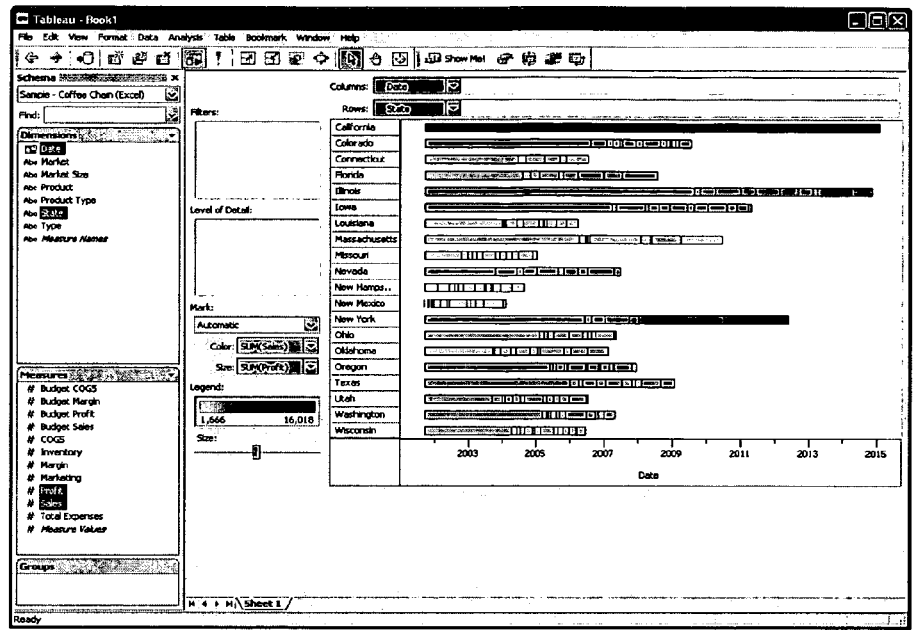

FIG. 8*i* shows a rendering of the data in a dataset in an resulting view where either the highest ranked view type was a Gantt chart, or the user selected the alternative Gantt chart view. The dataset must include only aggregated data, at least one field of ordinal data, less than three fields of dependent quantitative data, and at least one field of independently quantitative data or of relational dates.

Figure 8J:
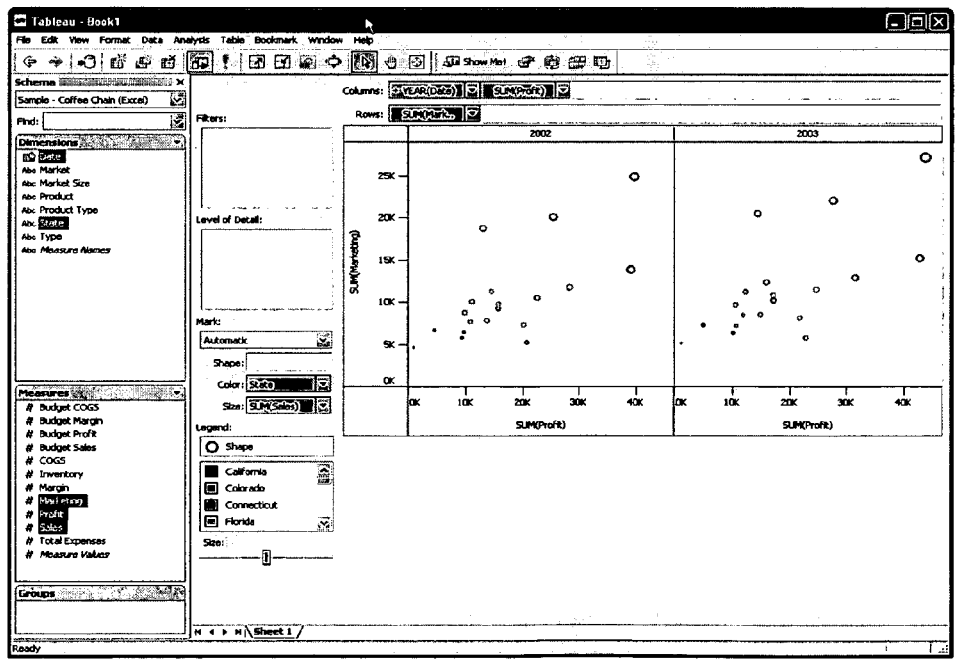

FIG. 8*j* shows a rendering of the data in a dataset in an resulting view where either the highest ranked view type was a single scatter plot, or the user selected the alternative single scatter plot view. The dataset must include two to four fields of dependent quantitative data, and at least one field of independent quantitative data.

Figure 8K:
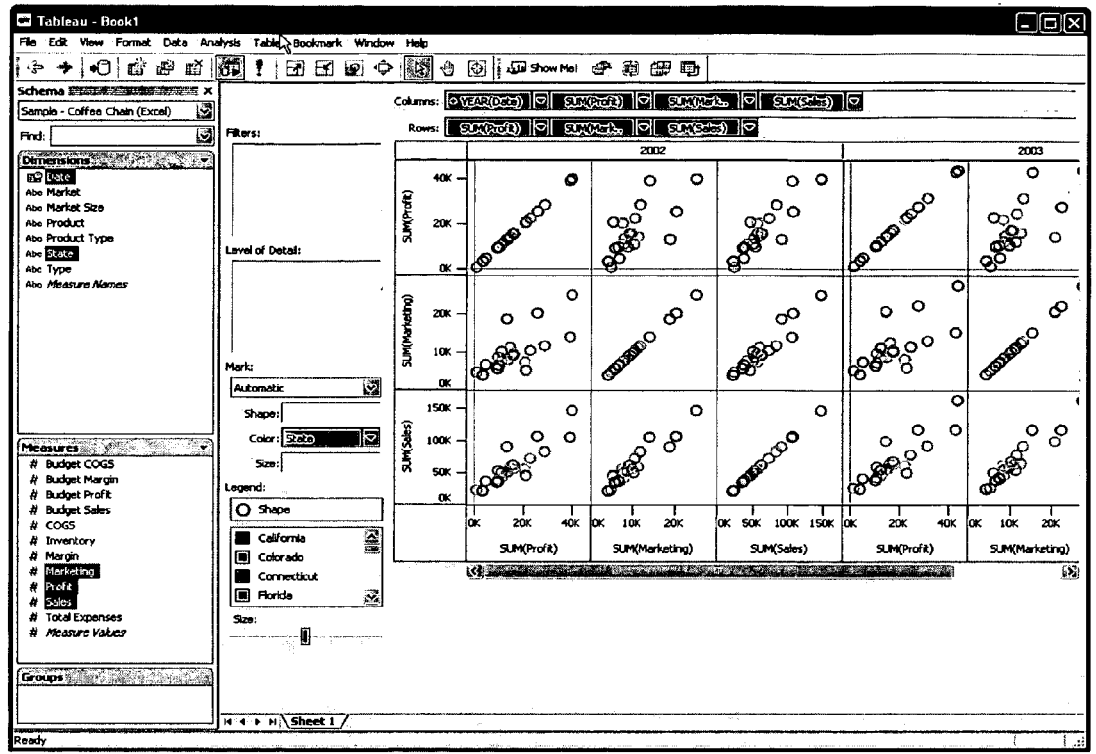

FIG. 8*k* shows a rendering of the data in a dataset in an resulting view where either the highest ranked view type was a matrix scatter plot, or the user selected the alternative matrix scatter plot view. The dataset must include three to six fields of dependent quantitative data, and at least one field of independent quantitative data.

Figure 8L:
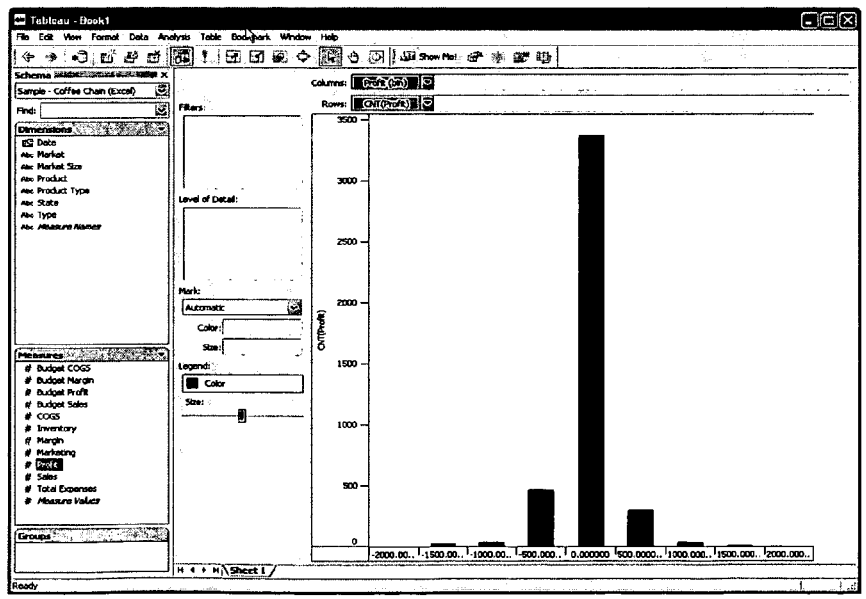

FIG. 8*l* shows a rendering of the data in a dataset in an resulting view where either the highest ranked view type was a histogram, or the user selected the alternative histogram view. The dataset must include only aggregated and relational data, must have exactly one field of dependent quantitative data, and must have no independent quantitative data.

The present invention not only accepts datasets and databases as inputs, it also accepts views as inputs. A view can be used to represent a set of fields. Resulting views can also depend on the existing view. For example, rules or operators can take into account the current view to generate a new view that is related to the current view. Also, as one skilled in the art will realize, many other rules are possible, include ones to generate statistical, maps, pie charts, and three dimensional views of data.

The present invention can be implemented as a computer program product that comprises a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product can also be distributed electronically, via the Internet or otherwise, by transmission of a computer data signal (in which the software modules are embedded) on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A method of ranking data visualizations, comprising:
   at a computing device having one or more processors and memory, wherein the memory stores one or more programs for execution by the one or more processors:
   receiving user selection of a set of data fields from a set of data;
   identifying a plurality of data visualizations that use each data field in the user-selected set of data fields;
   automatically forming a plurality of modified sets of data fields, each differing from the user-selected set by a limited sequence of at most two atomic operations, wherein each of the atomic operations is selected from the group consisting of:
   removing a single data field from the user-selected set;
   adding a single data field to the user-selected set;
   replacing a user-selected data field with a hierarchically narrower data field from the set of data;
   replacing a user-selected data field with a hierarchically broader data field from the set of data;
   adding a filter to a data field that limits values retrieved to a specified subset of values;
   removing a user-selected filter from a data field so that there is no limit on values retrieved for the data field; and
   modifying a filter for a data field, thereby altering values retrieved for the data field;
   identifying a plurality of respective alternative data visualizations, each respective alternative data visualization using each data field in a respective one of the modified sets of data fields;
   for each of the data visualizations and each of the alternative data visualizations, computing a score based on a set of ranking criteria, wherein at least one ranking criterion used to compute each score is based on patterns of data values of one or more of the data fields in the set of data; and
   presenting data visualization options to the user, wherein the presented options correspond to high scoring data visualizations and high scoring alternative data visualizations.

2. The method of claim 1, wherein the data visualization options are presented to the user in a single ranked list that is ordered according to the computed scores of the data visualizations and the computed scores of the alternative data visualizations.

3. The method of claim 1, wherein the data visualization options are presented to the user in two ranked lists, a first ranked list comprising high scoring data visualizations, ordered according to corresponding computed scores, and a second ranked list comprising high scoring alternative data visualizations, ordered according to corresponding computed scores.

4. The method of claim 1, wherein at least one of the alternative data visualizations is based on a modified set of data fields that differs from the user-selected set of data fields by including an additional data field from the set of data.

5. The method of claim 1, wherein at least one of the alternative data visualizations is based on a modified set of data fields that differs from the user-selected set of data fields by removing a user-selected data field.

6. The method of claim 1, wherein at least one of the alternative data visualizations is based on a modified set of data fields that differs from the user-selected set of data fields by replacing a first user-selected data field with a different data field that is hierarchically narrower than the first user-selected data field.

7. The method of claim 1, wherein at least one of the alternative data visualizations is based on a modified set of data fields that differs from the user-selected set of data fields by replacing a first user-selected data field with a different data field that is hierarchically broader than the first user-selected data field.

8. The method of claim 1, wherein at least one of the alternative data visualizations is based on a modified set of data fields that differs from the user-selected set of data fields by applying a filter to a user-selected data field, thereby limiting values of the user-selected data field to a first set of values, wherein the filter is not selected by the user.

9. The method of claim 1, wherein at least one of the alternative data visualizations is based on a modified set of data fields that differs from the user-selected set of data fields by removing a user-selected filter for a user-selected data field.

10. The method of claim 1, wherein at least one of the alternative data visualizations is based on a modified set of data fields that differs from the user-selected set of data fields by modifying a user-selected filter for a data field, thereby altering values retrieved for the data field.

11. The method of claim 1, further comprising:
    receiving user selection from the presented data visualization options; and
    displaying a data visualization on the computing device corresponding to the user-selected option.

12. A computer system for ranking data visualizations, comprising:
    one or more processors;
    memory; and
    one or more programs stored in the memory for execution by the one or more processors, the one or more programs comprising instructions for:
    receiving user selection of a set of data fields from a set of data;
    identifying a plurality of data visualizations that use each data field in the user-selected set of data fields;
    automatically forming a plurality of modified sets of data fields, each differing from the user-selected set by a limited sequence of at most two atomic operations, wherein each of the atomic operations is selected from the group consisting of:
    removing a single data field from the user-selected set;
    adding a single data field to the user-selected set;
    replacing a user-selected data field with a hierarchically narrower data field from the set of data;
    replacing a user-selected data field with a hierarchically broader data field from the set of data;
    adding a filter to a data field that limits values retrieved to a specified subset of values;

removing a user-selected filter from a data field so that there is no limit on values retrieved for the data field; and modifying a filter for a data field, thereby altering values retrieved for the data field;

identifying a plurality of respective alternative data visualizations, each respective alternative data visualization using each data field in a respective one of the modified sets of data fields;

for each of the data visualizations and each of the alternative data visualizations, computing a score based on a set of ranking criteria, wherein at least one ranking criterion used to compute each score is based on patterns of data values of one or more of the data fields in the set of data; and presenting data visualization options to the user, wherein the presented options correspond to high scoring data visualizations and high scoring alternative data visualizations.

13. The computer system of claim 12, wherein the data visualization options are presented to the user in a single ranked list that is ordered according to the computed scores of the data visualizations and the computed scores of the alternative data visualizations.

14. The computer system of claim 12, wherein the data visualization options are presented to the user in two ranked lists, a first ranked list comprising high scoring data visualizations, ordered according to corresponding computed scores, and a second ranked list comprising high scoring alternative data visualizations, ordered according to corresponding computed scores.

15. The computer system of claim 12, wherein at least one of the alternative data visualizations is based on a modified set of data fields that differs from the user-selected set of data fields by replacing a first user-selected data field with a different data field that is hierarchically narrower than the first user-selected data field.

16. The computer system of claim 12, wherein at least one of the alternative data visualizations is based on a modified set of data fields that differs from the user-selected set of data fields by replacing a first user-selected data field with a different data field that is hierarchically broader than the first user-selected data field.

17. A non-transitory computer readable storage medium storing one or more programs configured for execution by a computer system having one or more processors and memory storing one or more programs for execution by the one or more processors, the one or more programs comprising instructions for:

receiving user selection of a set of data fields from a set of data;

identifying a plurality of data visualizations that use each data field in the user-selected set of data fields;

automatically forming a plurality of modified sets of data fields, each differing from the user-selected set by a limited sequence of at most two atomic operations, wherein each of the atomic operations is selected from the group consisting of:

removing a single data field from the user-selected set;

adding a single data field to the user-selected set;

replacing a user-selected data field with a hierarchically narrower data field from the set of data;

replacing a user-selected data field with a hierarchically broader data field from the set of data;

adding a filter to a data field that limits values retrieved to a specified subset of values;

removing a user-selected filter from a data field so that there is no limit on values retrieved for the data field; and modifying a filter for a data field, thereby altering values retrieved for the data field;

identifying a plurality of respective alternative data visualizations, each respective alternative data visualization using each data field in a respective one of the modified sets of data fields;

for each of the data visualizations and each of the alternative data visualizations, computing a score based on a set of ranking criteria, wherein at least one ranking criterion used to compute each score is based on patterns of data values of one or more of the data fields in the set of data; and presenting data visualization options to the user, wherein the presented options correspond to high scoring data visualizations and high scoring alternative data visualizations.

18. The computer readable storage medium of claim 17, wherein the data visualization options are presented to the user in two ranked lists, a first ranked list comprising high scoring data visualizations, ordered according to corresponding computed scores, and a second ranked list comprising high scoring alternative data visualizations, ordered according to corresponding computed scores.

19. The computer readable storage medium of claim 17, wherein at least one of the alternative data visualizations is based on a modified set of data fields that differs from the user-selected set of data fields by replacing a first user-selected data field with a different data field that is hierarchically narrower than the first user-selected data field.

20. The computer readable storage medium of claim 17, wherein at least one of the alternative data visualizations is based on a modified set of data fields that differs from the user-selected set of data fields by replacing a first user-selected data field with a different data field that is hierarchically broader than the first user-selected data field.

* * * * *